VARIABLE THRESHOLD PLAYBACK AMPLIFIER

Original Filed Sept. 13, 1962 16 Sheets-Sheet 1

INVENTOR
ALAN K. JENSEN

BY [signature]

ATTORNEY

INVENTOR
ALAN K. JENSEN

BY David Teschner

ATTORNEY

VARIABLE THRESHOLD PLAYBACK AMPLIFIER

INVENTOR
ALAN K. JENSEN

BY David Leschane

ATTORNEY

INVENTOR
ALAN K. JENSEN

BY David Teaslane

ATTORNEY

INVENTOR
ALAN K. JENSEN

BY David Teeling

ATTORNEY

Dec. 9, 1969 A. K. JENSEN 3,483,542

VARIABLE THRESHOLD PLAYBACK AMPLIFIER

Original Filed Sept. 13, 1962 16 Sheets-Sheet 6

INVENTOR
ALAN K. JENSEN

BY David Teacher

ATTORNEY

VARIABLE THRESHOLD PLAYBACK AMPLIFIER

Original Filed Sept. 13, 1962 16 Sheets-Sheet 7

INVENTOR.
ALAN K. JENSEN

BY David [signature]

ATTORNEY

VARIABLE THRESHOLD PLAYBACK AMPLIFIER

Original Filed Sept. 13, 1962 16 Sheets-Sheet 8

INVENTOR.
ALAN K. JENSEN
BY
David Teaslin
ATTORNEY

INVENTOR
ALAN K. JENSEN

BY David Teschner

ATTORNEY

INVENTOR.
ALAN K. JENSEN

BY [signature]

ATTORNEY

VARIABLE THRESHOLD PLAYBACK AMPLIFIER

Original Filed Sept. 13, 1962 16 Sheets-Sheet 11

INVENTOR
ALAN K. JENSEN
BY David Seacline

ATTORNEY

INVENTOR
ALAN K. JENSEN

BY David Teschner

ATTORNEY

Dec. 9, 1969 A. K. JENSEN 3,483,542

VARIABLE THRESHOLD PLAYBACK AMPLIFIER

Original Filed Sept. 13, 1962 16 Sheets-Sheet 13

INVENTOR.
ALAN K. JENSEN

BY David Teacher

ATTORNEY

INVENTOR
ALAN K. JENSEN

BY David Teacher[?]

ATTORNEY

INVENTOR
ALAN K. JENSEN

BY David Seaberg

ATTORNEY

VARIABLE THRESHOLD PLAYBACK AMPLIFIER

INVENTOR
ALAN K. JENSEN

BY David Seachne

ATTORNEY

United States Patent Office 3,483,542
Patented Dec. 9, 1969

3,483,542

VARIABLE THRESHOLD PLAYBACK AMPLIFIER

Alan K. Jensen, Livingston, N.J., assignor to Litton Business Systems, Inc., a corporation of New York

Original application Sept. 13, 1962, Ser. No. 223,361, now Patent No. 3,349,369, dated Oct. 24, 1967. Divided and this application Jan. 24, 1967, Ser. No. 611,320

Int. Cl. G11b *5/00*

U.S. Cl. 340—174.1 3 Claims

ABSTRACT OF THE DISCLOSURE

The threshold of the playback amplifier is set high enough to reject unwanted noise signals but accept valid information signals above the threshold level. Upon the arrival of a signal exceeding the threshold level, a determination is made by associated circuitry as to whether this signal is a valid information signal or not. If a valid information signal, the playback amplifier threshold is reduced so as to permit the entire information signal to be accepted despite possible information signal degradation which would render portions of the information signal unacceptable at the higher playback amplifier threshold.

This is a divsion of application Ser. No. 223,361 filed Sept. 13, 1962 now U.S. Pat. 3,349,369.

BACKGROUND OF THE INVENTION

Field of the invention

This invention relates generally to information storage systems and more particularly to an information storage system employing record cards having a magnetizable coating on at least one surface thereof and associated transport and electronic circuitry for selectively reading information from or selectively recording information upon such magnetizable surface of said record cards. Information may be read from, recorded on and erased from these record cards so as to provide an information storage system capable of updating the information on a record card. This eliminates the necessity of discarding an old record card and supplying a new one every time there is a need to change information on a record card. The apparatus is particularly useful with a computing apparatus which takes information from the magnetic record card, operates on the information and then returns the information or some new result to the record card.

Description of the prior art

In prior art devices the threshold level of the playback amplifier was set in accordance with a compromise level established after considering the susceptibility of the system to noise, the signal to noise level, the signal degradation within the system and error checking and error correcting facilities within the system. Attempts were made to minimize the effects of these conditions by providing shielding and altering the circuitry of the playback system to reject or be less susceptible to noise. The signal levels were increased to increase the signal to noise ratio. The playback amplifiers were gated to accept less than the full information signal and still provide useful outputs. Additional frequent pulse shaping was employed. Finally, error checking and correcting equipment was employed. The net effect of all of these approaches was to decrease the signal density on the recording medium, increase the cost of the system, slow down its operating speed and decrease its efficiency. Further, since the playback level was a compromise between these factors, it was still possible to lose information signals or accept noise signals.

SUMMARY OF THE INVENTION

The playback amplifier of this invention is arranged to have two threshold levels and is switched therebetween by related circuitry. This circuitry determines whether or not a signal read by the playback amplifier is noise or an expected information signal. Initially, the playback amplifier is set to its high threshold condition so that any signal having an amplitude less than that of a desired information signal is rejected. As soon as a signal having an amplitude anywhere along its length (duration which exceeds the threshold appears, the associated circuitry determines from its location, the time since the last information signal, and the computer clock signals, whether it is noise or a valid information signal. If noise, the playback amplifier threshold is maintained high and the signal rejected. If the signal is a valid information signal, the playback amplifier is switched to its lower threshold level and the signal is accepted providing it exceeds this lower threshold value. In this way the upper threshold level can be set to eliminate noise while the lower threshold level can be set to accept a signal despite severe degradation.

It is therefore a broad object of the invention to provide an improved information storage apparatus.

It is a further object of the invention to provide an improved information storage apparatus using magnetic record cards.

It is a further object of the invention to provide improved circuitry for controlling the movement of magnetic record cards proximate magnetic read record heads.

It is a further object of the invention to provide improved circuitry for controlling the recording of information on and reading information from magnetic record cards.

It is still another object of the invention to provide an improved playback amplifier system with increased noise immunity and a variable input threshold whereby signals recorded upon a magnetic record card can be read despite signal degradation.

These and other objects and novel features of the invention are set forth in the appended claims and the invention as to its organization and its mode of operation will best be understood from a consideration of the following detailed description of the preferred embodiment when used in connection with the accompanying drawings which are hereby made a part of the specification.

DESCRIPTION OF THE PREFERRED EMBODIMENT

The system utilizes standard record cards coated with a magnetic surface as the storage medium. Since recording is by magnetic recording rather than by punching, as is done in the usual arrangement, a far greater amount of information can be recorded upon the record card than is possible in punched record card systems.

The magnetic record card system may be utilized as an auxiliary to electronic computer devices.

Figures 1, 2:
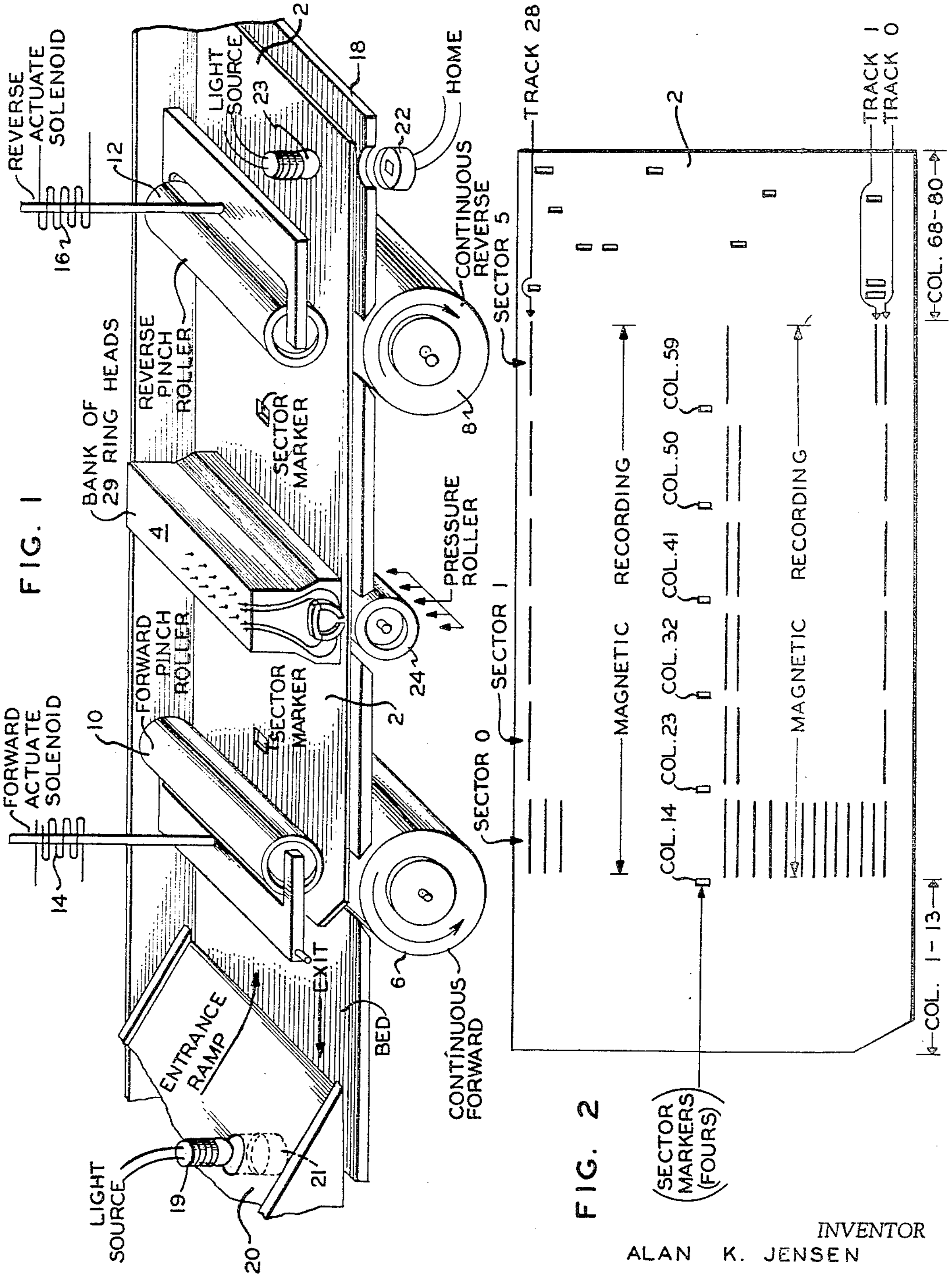
FIG. 1 is a perspective representation of the magnetic record card transport apparatus.
FIG. 2 is a view of one type of record card used by the magnetic card transport.

The basic record card transport for selectively transporting and positioning the record card may be understood by reference to FIG. 1. The record card transport is described in greater detail and claimed in U.S. Patent No. 3,296,605, issued Jan. 3, 1967, entitled "Magnetic Card Reader and Transport" by Raddin and LaManna and assigned to the assignee of the instant invention. The record card 2 is transported in a reciprocating fashion in contact with a head bank 4 containing 29 ring type magnetic read write heads. The drive source for record card 2 movement is supplied by a pair of counter rotating dive rollers 6 and 8. The record card 2 is friction driven by one or the other of the rollers 6 or 8 when an associated pinch roller 10 or 12 is operated through a solenoid 14 or 16. The record card 2 can thus be driven forwad, if pinch roller 10 is operated by solenoid 14 to cause contact between the record card 2 and the pinch roller 10 and the forward drive roller 6 reverse if pinch roller 12 is operated by solenoid 12 to cause contact between the record card 2 and the pinch roller 12 and the reverse drive roller 8 or will stand still if neither pinch roller solenoid 14 or 16 is actuated. This is illustrated in the sketch of FIG. 1. The card is supported on a fixed platform 18 called the bed. Apertures in the bed allow contact with the drive rollers 6 and 8.

Record cards 2 enter and exit the transport from the same end of the bed 18. The record card supply (not shown) and entrance ramp 20 are elevated over the bed 18 and the exit route is under the entrance ramp 20.

Record cards 2 may be ejected under computer control (not shown) or by a manual eject switch (not shown) at any time and may be selectively placed in one of two output bins (not shown) under computer control.

A solenoid operated clutch (not shown) serves to deal (as used in this description the term "deal" is intended to describe the operation of feeding the lowest card from the supply stack into the record card transport) a record card 2 from the bottom of the supply stack (not shown) and down the entrance ramp 20. The deal solenoid is operated automatically following an eject command that is, deal in involuntary and the system will insist on maintaining a record card 2 in the transport unless prevented by operation of a manual switch (not shown) provided for that purpose.

A second solenoid, called the gate solenoid (not shown) is operated simultaneously with the deal clutch. This solenoid is used to remove a pin (not shown) which blocks the entrance ramp 20 except when the clutch is operated. The pin blocking the entrance ramp 20 prevents manual force feeding of record cards 2 into the bed 18.

The end of the bed 18 opposite the entrance ramp 20 is called the "home" position from which all read and write operations must commence. When in the home position the record card 2 interrupts a path from a light source 23 to a photocell 22, thereby signifying the record card 2 is at the home position and signifies the end of travel in the reverse direction. The reading or writing is done as the record card 2 travels in the direction away from the home position, that is the forward direction, and is returned to the home position when the operation is complete unless an eject command is provided.

A pressure roller 24 contacts the under surface of the record card 2 directly beneath the air gaps of the individual heads of the head bank 4 and serves to maintain head to record card contact.

The head band 4 is made up of 29 ring type, ferrite core read write heads, representing the 29 channels of information. Only one head is in use at any one time and simultaneous read and write is normally not done. The track width in the tracks along the length of the record cards 2 in the preferred embodiment is .040″ with a .001″ air gap length. The windings are 1000 turns of #44 wire, center tapped. A head located near the center of the record card 2 width is used exclusively for reading marker or sector pulses which signify the beginning of each word sector on a track. This head is physically different in that the pole-pieces are .100″ wide to yield superior signal to noise characteristics.

The record card 2 is shown in FIG. 2. The record card 2 in the preferred embodiment is standard punched card stock 3¼″ x 4″ x 7⅜″ x .007″ with an iron oxide coating on one face .001″ thick.

There are 29 magnetic tracks running lengthwise on the card containing 6 words each. Each word being located in a separate one of the six sectors in each track. The words are 66 bits long with 34 of these bits reserved for redundancy checking. The bit density is 100 bits per inch on a track and the tracks are spaced on .1″ centers.

There are 13 standard punching columns at each end of the record card 2 which may be used for identification and sorting. The number of punching columns may be increased by reducing the number of magnetic sectors used.

There are holes in the columnar positions corresponding to a standard punched record card at columns 14, 23, 32, 41, 50 and 59 at the position that would normally be occupied by the four rows of a standard punched record card. These 6 holes are used to identify the start of sectors on the magnetic tracks and are read magnetically by the sector head described hereafter. Information may also be printed on the card.

Figure 3A:
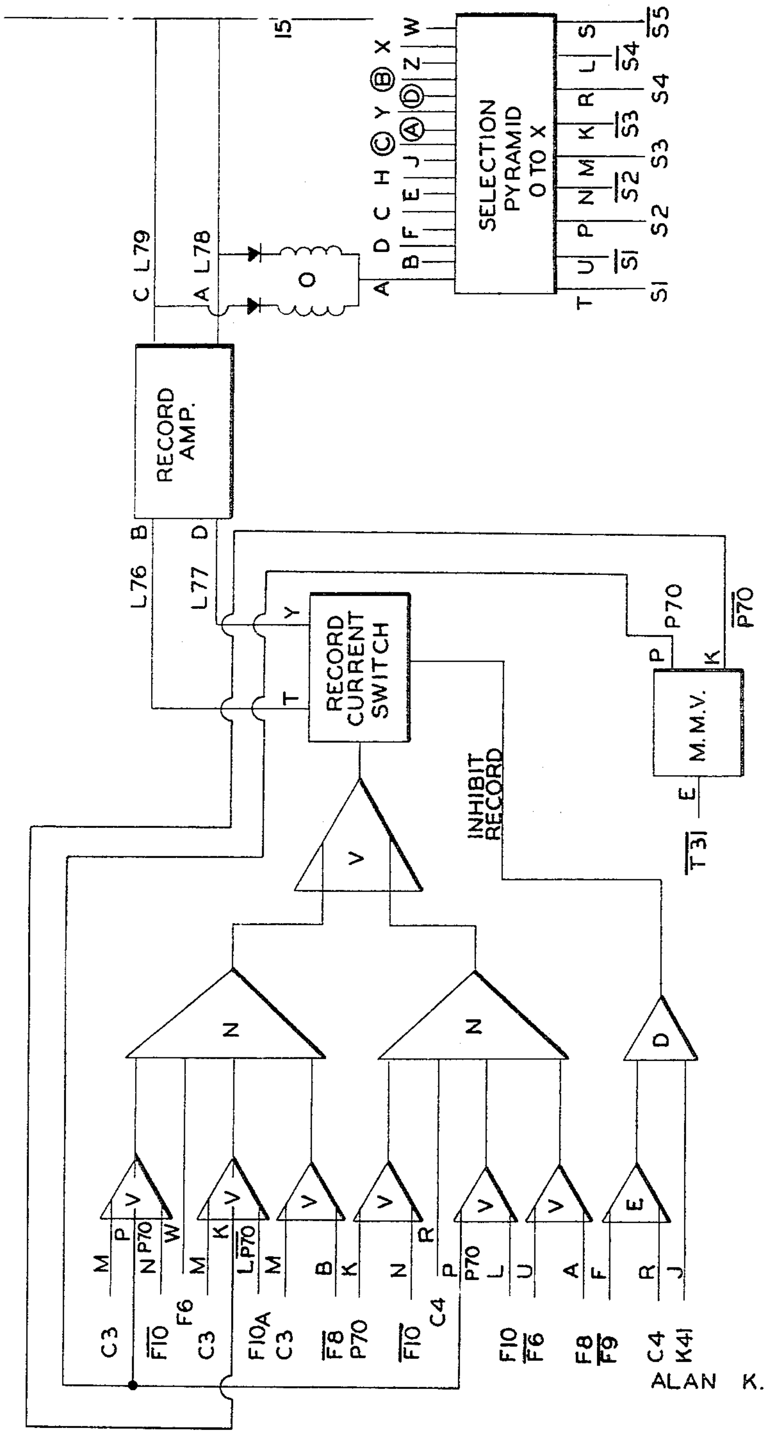
FIG. 3, composed of FIGS. 3*a* and 3*b*, joined as shown in FIG. 3, is a block diagram of the record logic and a portion of selection pyramid (FIG. 3*a*) and of the playback logic and the remainder of the selection pyramid (FIG. 3*b*).
FIG. 3*c* is a block diagram of the selection dividers.
FIG. 3*d* is a block diagram of the Sector Drop-Out Detector.
FIG. 3*e* is a block diagram of the Information Drop-Out Detector.
FIG. 3*f* is a block diagram of the Sector Playback System.
FIG. 3*g* is a block diagram of the F72 Flip-Flop and Ramp Photocell Amplifier.
FIG. 3*h* is a block diagram of the F71 Flip-Flop and Home Photocell Amplifier.
FIG. 3*i* is a block diagram of the Transport, Hopper and Bin Solenoid Drivers.
Figure 3B:
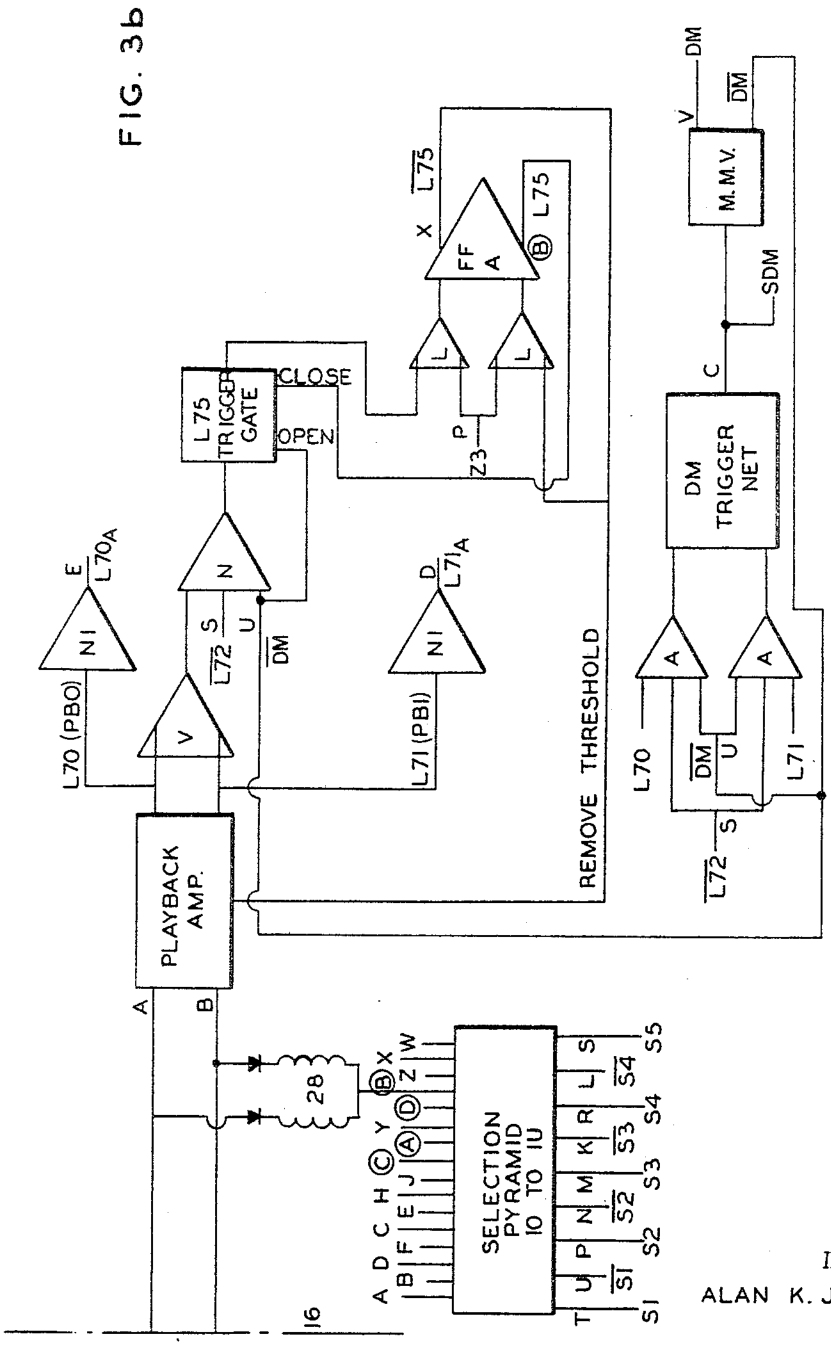
Figure 3:
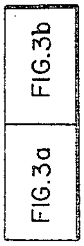
Figure 3C:
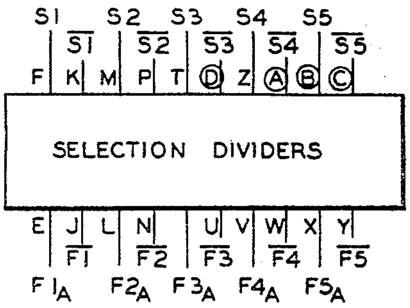
Figure 3D:
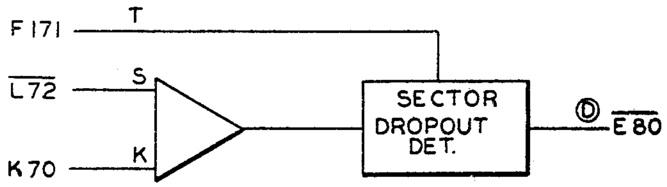
Figure 3E:
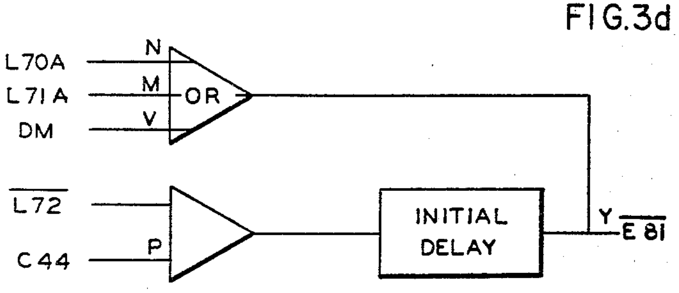
Figure 18:
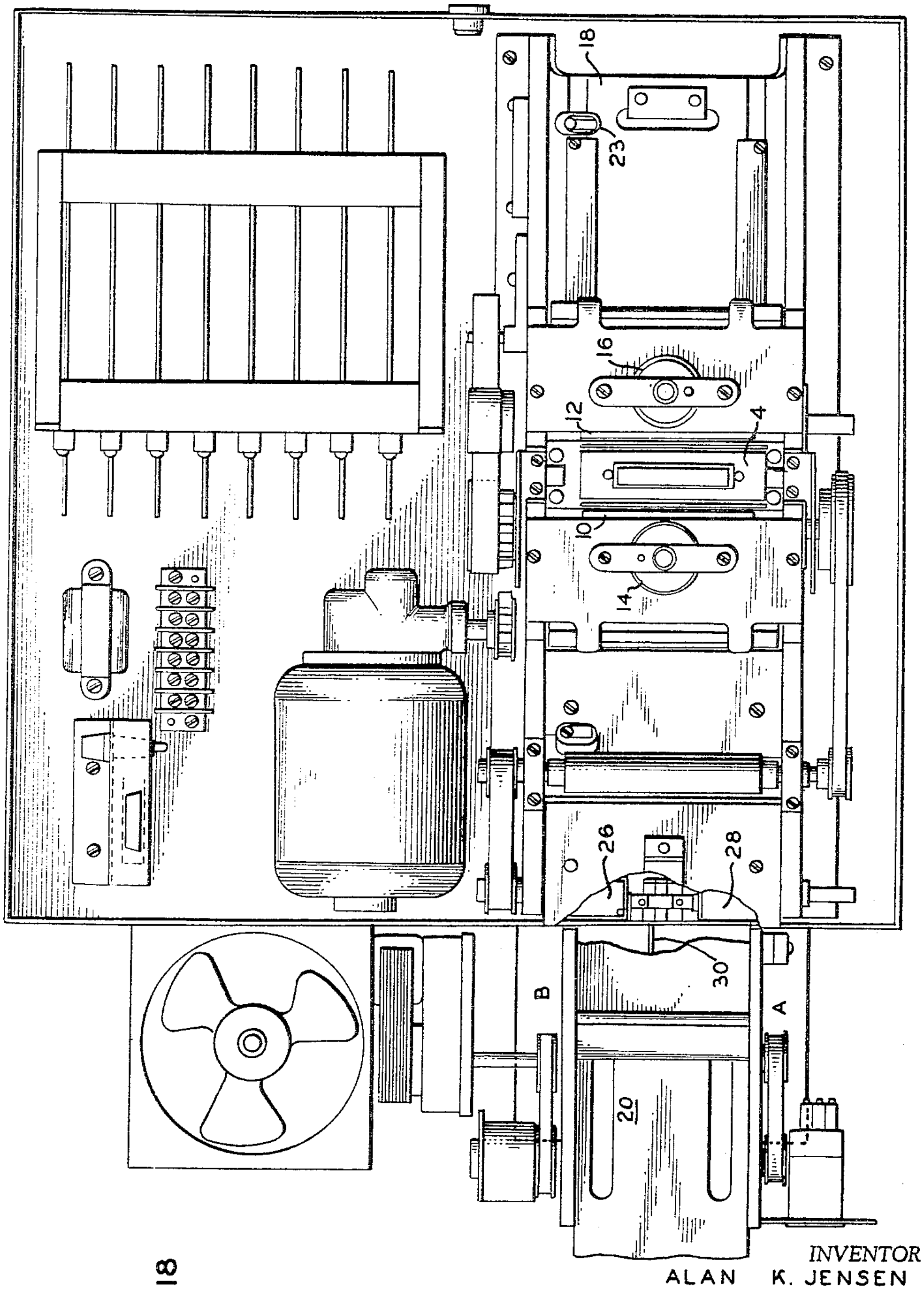
FIG. 18 is a plan view of the magnetic card transport of FIG. 1.

FIGS. 3*a* and 3*b*, connected as shown in FIG. 3, together with FIGS. 3*c*, 3*d*, 3*e*, 3*f*, 3*g*, 3*h*, 3*i*, illustrate the basic electronic circuitry of the magnetic card transport of FIGS. 1 and 18. Circuits are grouped which indicate the printed circuit board on which they are located. Pin numbers for between board connections are included. Some circuit components are drawn in detail, where a suitable logical symbol does not exist.

RECORD CARD CONTROL

Control of the record card 2 may be understood from the following description when taken with FIGS. 1, 2, 3*a* through 3*i* and 18.

Figure 3F:
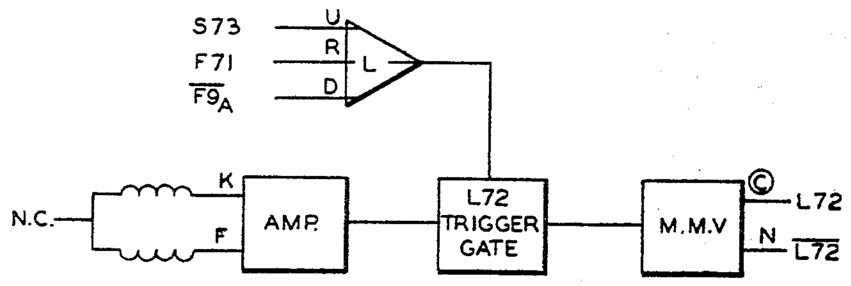
Figure 3G:
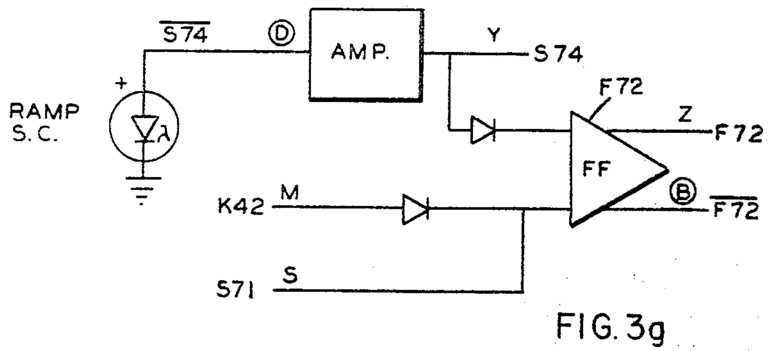

The two flip-flops F71 and F72 (see FIGS. 3*h* and 3*g*, respectively) are used to control record card 2 movement in the transport. Decoding of these flip-flop conditions and subsequent operation of an appropriate solenoid is accomplished by five solenoid drive circuits forward and reverse pinch roller, deal, gate and card sorter (the card sorter solenoid controls the deflector 30 to determine whether an ejected record card 2 will enter the bin A or bin B selection pockets), as shown in FIG. 3*i*. Two photocells and amplifiers are also used in controlling record card 2 movement. These are, the home photocell 22 creating signal S73, and the ramp photocell 21 creating signal S74.

Operation of the circuitry to control the movement of record cards 2 in the transport may best be understood through an example of ejecting a record card 2 and obtaining the next one.

One of two eject signals can be supplied to reset flip-flop F72. A K42 eject command signal may be supplied by the computer or the manual eject signal S71 from the manual eject switch S1. Either signal arriving at the input to flip-flop F72 (see FIG. 3*g*) sets the $\overline{\text{F72}}$ side high (high=0 volt) and F72 low (low=−6.0 volts). The input logic to the solenoid drive circuits (see FIG. 3*i*) is such that regardless of other input conditions, when the $\overline{\text{F72}}$ output line of the flip-flop F72 is high the record card 2 will be driven forward and out. Eject is therefore unconditional. Simultaneously, the K42 signal operates one of the two solenoid drivers 26 or 28, shown in FIG. 18, to operate a deflector 30 placing the ejected record card 2 into bin A or B dependent upon the output condition of a computer flip-flop F1 (not shown). Since the computer eject command signal K42 is very short in duration compared to the time necessary to operate the deflector 30 (see FIG. 18) the two driver circuits are made regenerative (note signals K74 and K75) to provide continued drive to the deflector 30.

Further examination of the solenoid drivers reveals that after a delay sufficient for the ejected record card 2 to clear the bed 18, the output of flip-flop F72 on the $\overline{\text{F72}}$ line will operate the deal clutch and send the next record card 2 down the ramp 20. Simultaneous with operation of the clutch the same drive circuit operates a second solenoid to remove a gate pin (not shown) normally blocking the entrance ramp 20.

It should be noted that operation of the manual eject switch S1, to the position of S71 interrupts the connection to the deal clutch and thereby provides means for preventing the automatic deal. This is a two-position pushbutton switch and may be left in the S71 position. Indicating lamps associated with the pushbutton switch will be ON in the normal operate position, when the record transport is ready to receive the next record card 2.

When the delayed signal K72 appears at the output of the deal drive circuit, the signal serves to reset whichever of the flip-flops selecting the bin had been set. The deflector 30 itself is also bistable and when driven to either position will remain there without further drive. The two deflector drive circuits 26 and 28 (see FIG. 18) are merely acting as pulse stretchers to extend the output signal of the computer flip-flop F1 which was received at the time K42 signal was received. Actually, the ejected record card 2 may not have yet reached the deflector 30 when the deflector drive is removed, making mechanical memory essential.

In the event of a manual eject the deflector 30 is not operated, there will be no K42 signal and the record card 2 will go into the last selected bin.

Continuing the sequence of events and assuming the manual switch S1 to be in the normal deal position, the next record card 2 will travel down the ramp 20 and the next electronic change occurs when the next record card 2 interrupts the light to the ramp photocell 21 on the ramp 20, creating the signal S74. Interrupting the light causes the signal S74 to go high which in turn restores the flip-flop F72 (see FIG. 3*g*) and sets the flip-flop's output lines as follows: F72 high and $\overline{\text{F72}}$ low signifying the next record card 2 is down the ramp 20 and entering the bed 18.

Figure 3H:
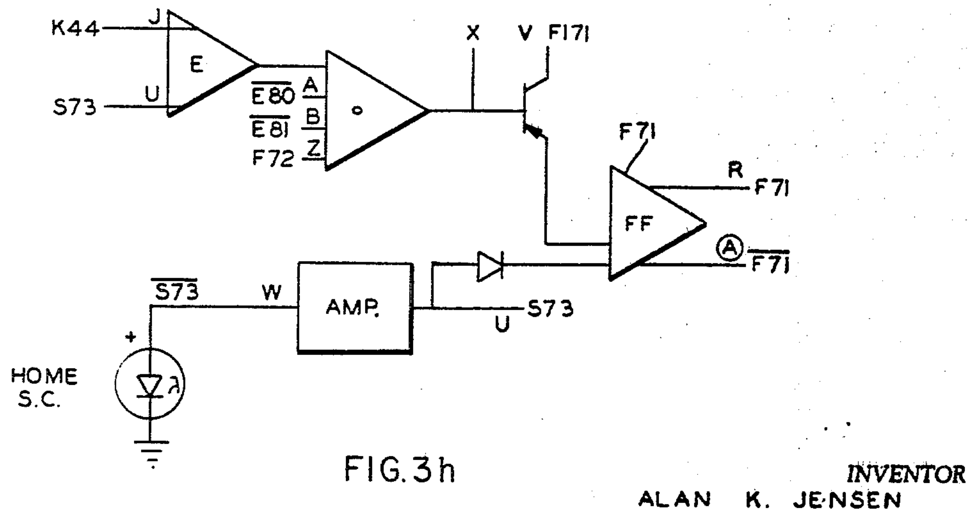
Figure 3I:
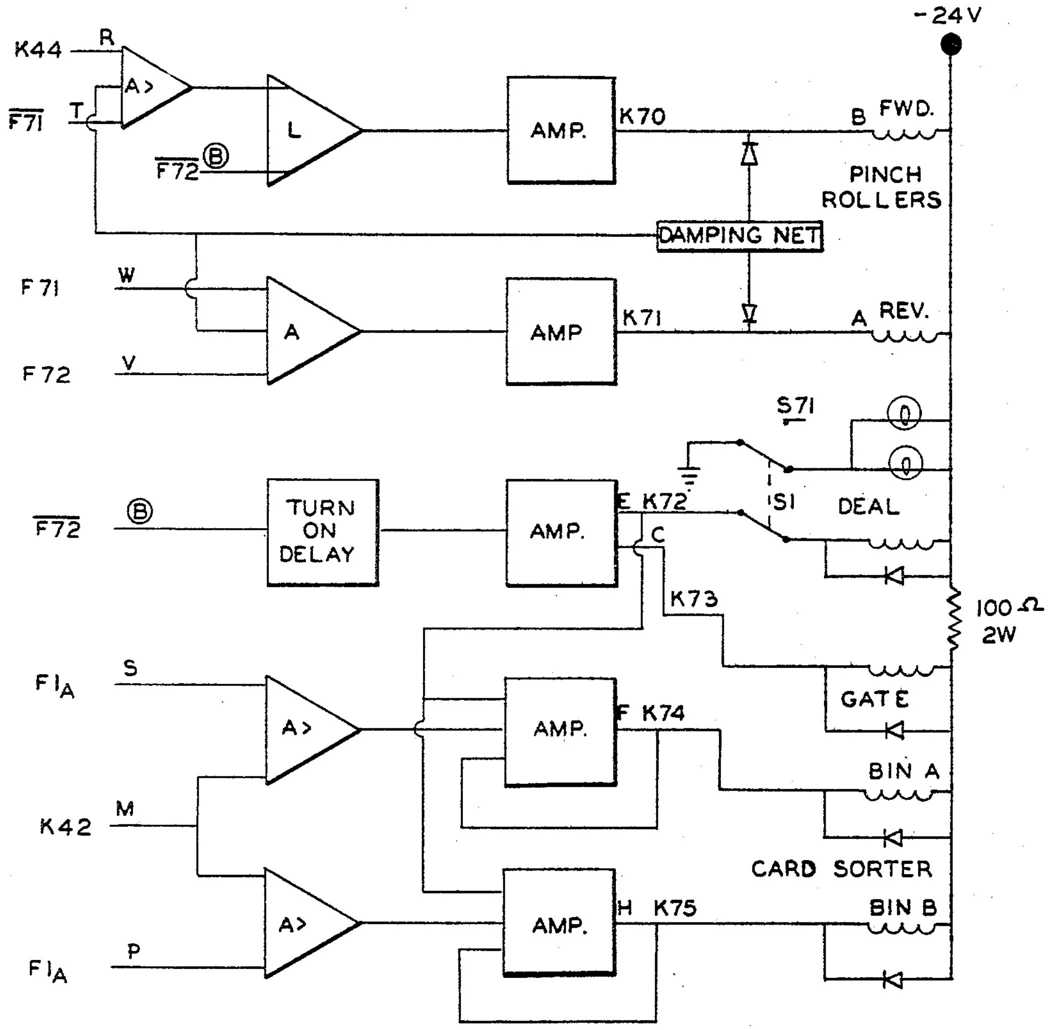
Figure 4:
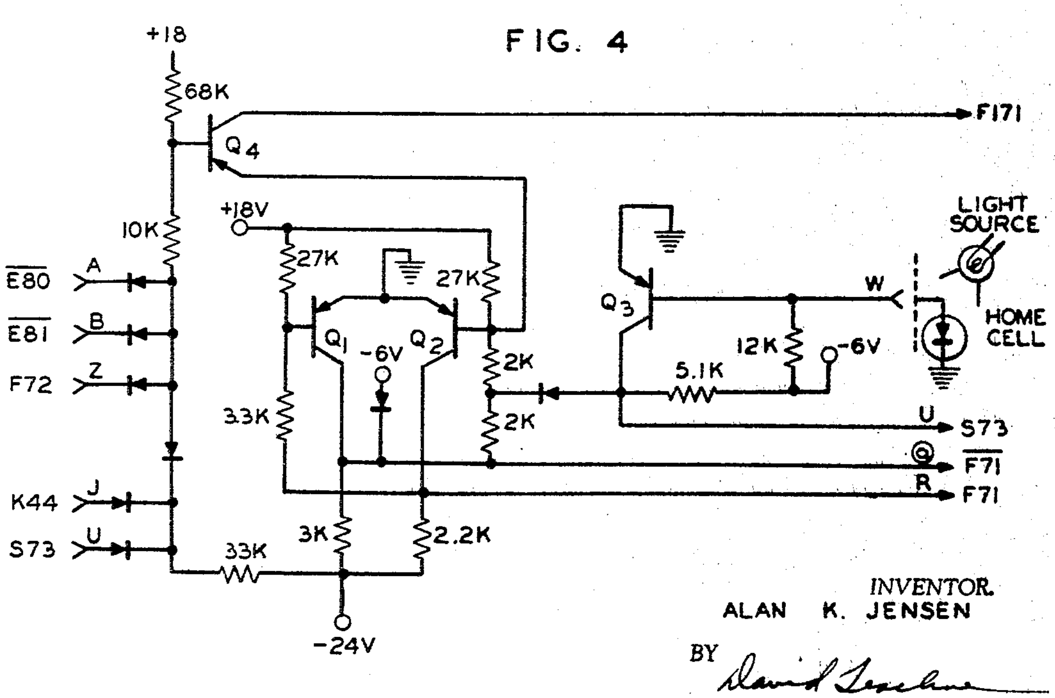
FIG. 4 is a schematic diagram of the F71 Flip-Flop and Home Photocell Amplifier of FIG. 3*h*.

Flip-flop F71 meanwhile is in the condition wherein the output lines are set such that F71 is high due to the F72 input on the F71 set logic (see FIGS. 3*h* and 4). The diodes perform a negative or function so that with the signal F72 low, or the computer eject command signal K44 low, the F71 set logic will provide a low out of pin X. This output is fed to the trigger transistor of flip-flop F71. As far as triggering flip-flop F71 is concerned, the transistor acts as an emitter following pulling $\overline{\text{F71}}$ low. An output is also taken from the collector of this transistor and is used in error detection which is described hereafter. Flip-flop F71 is set whenever an eject occurs due to the F72 input signal.

The combination of signals F71 and F72 both high provides drive for the reverse pinch roller solenoid 16 (see FIG. 1) and also removes drive from forward, and deal solenoid (see FIG. 3*i*).

The record card 2 will thus travel in reverse, toward the home position, until the light to the home photocell 22 is interrupted causing S73 to go high. S73 going high will reset F71 low by pulling $\overline{\text{F71}}$ high stopping the reverse drive. This completes the eject and deal cycle. The condition now is $\overline{\text{F71}}$, S73, and F72 high. This may be thought of as the ready condition from which all read and write operations must commence. Even if K44, read or write signal is high when the next record card 2 is traveling in, the ready condition cannot be reached until the record card 2 arrives at the home position.

To commence a read or write operation the signal K44 will go high and if the ready condition exists, the forward drive solenoid 14 (see FIG. 1) will be operated. The record card 2 will travel forward so long as the K44 signal is high and during the travel the read or write operation will take place in the proper address. The method of finding the proper address is described hereafter. As soon as the reading or writing is complete the computer will allow the K44 signal to return low removing the forward drive.

During its forward travel the record card 2 left the home position causing the signal S73 to go low. At this point, the F71 set logic provides a low to the trigger transistor due to signals K44 and S73 both being low. Flip-flop F71 therefore gets set and reapplies the reverse drive sending the record card 2 to the home position. As soon as signal S73 reappears flip-flop F71 will get reset and the ready condition exists once more. Note here that signal K44 may be returned high before the record card 2 arrives at the home position in preparation for the next read or write cycle.

CARD CONTROL CIRCUITS

FIG. 4 is a schematic diagram of the F71 flip-flop and the photocell amplifier providing the home signal S73. These circuits are described in detail in copending application Ser. No. 223,361, filed Sept. 13, 1962, entitled "Magnetic Card System" by Alan K. Jensen and assigned to the assignee of the instant application, the disclosure of which is incorporated herein by reference.

Figure 5:
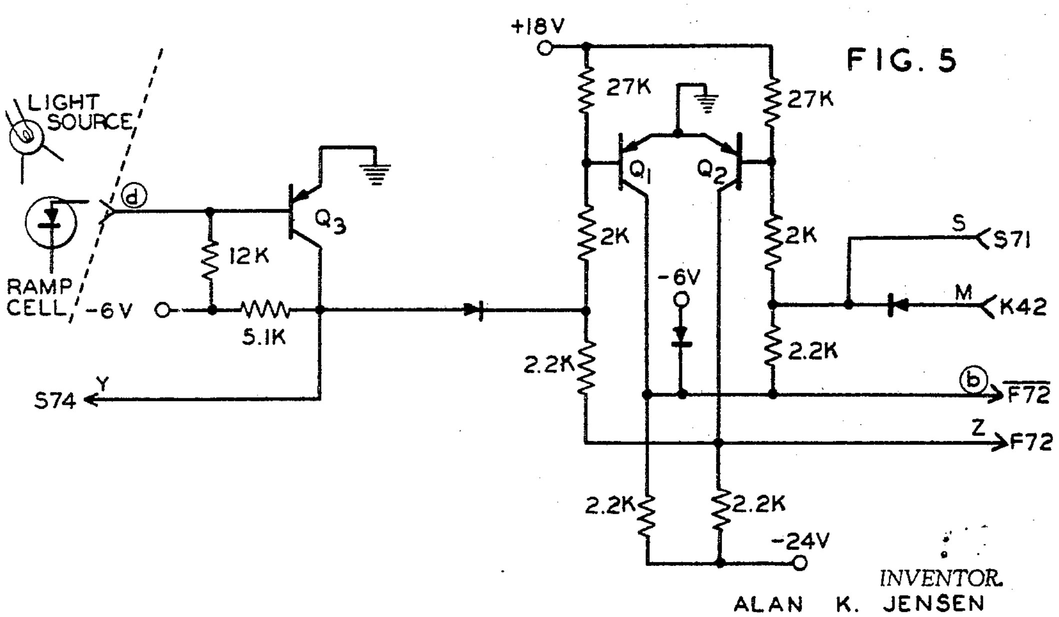
FIG. 5 is a schematic diagram of the F72 Flip-Flop and Ramp Photocell Amplifier of FIG. 3*g*.

FIG. 5 is a schematic of the F72 flip-flop and the ramp photocell amplifier S74, shown in the block diagram of FIG. 3*g*.

Design and operation of the S74 amplifier is identical to S73.

The F72 flip-flop is essentially the same as F71 except that both coupling resistors have been divided to provide positive DC trigger points. Within the F72 flip-flop only $\overline{F72}$ is clamped.

Figure 6:
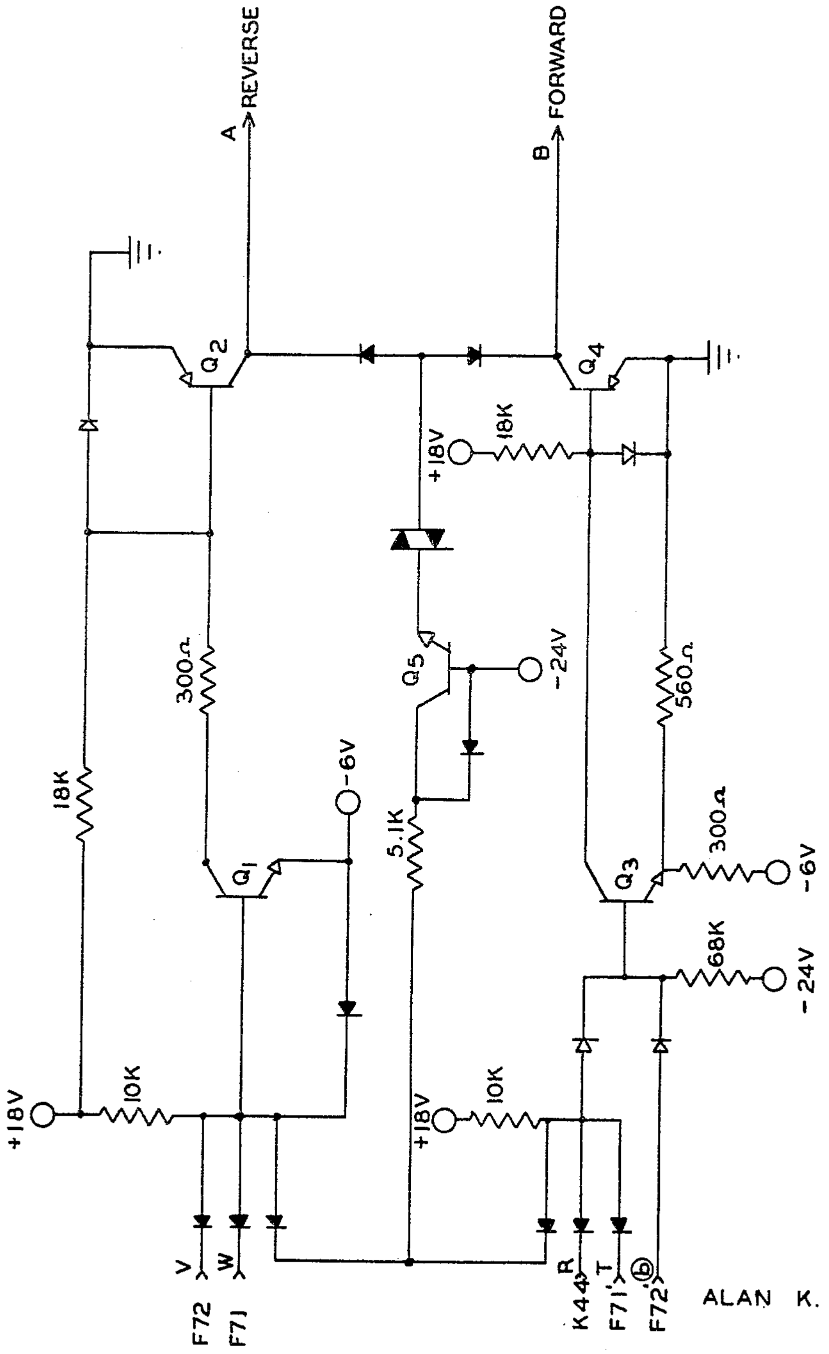
FIG. 6 is a schematic diagram of the Transport Solenoid Drivers of FIG. 3*i*.

FIG. 6 is a schematic of the solenoid drive circuits which actuate the pinch rollers for forward and reverse record card motion, shown in the block diagram of FIG. 3*i*. The details of FIGS. 5 and 6 are set forth in the above cited Jensen application Ser. No. 223,361.

Figure 7:
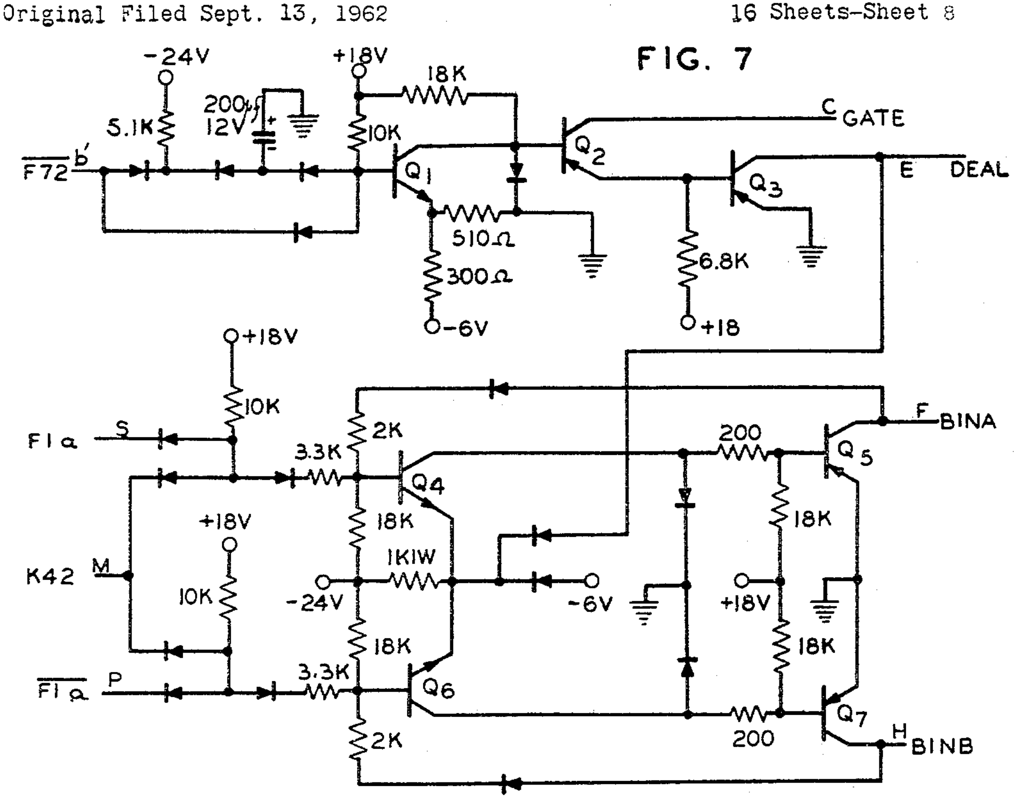
FIG. 7 is a schematic diagram of the Hopper and Bin Solenoid Drivers of FIG. 3*i*.

FIG. 7 shows the schematics of the solenoid drivers for operation of the deal, ramp gate and output bin selector solenoids, shown in the block diagram of FIG. 3*i* and described in detail in the cited Jensen application Ser. No. 223,361.

ADDRESSING

An address of a word stored on the record card 2 of FIG. 2 consists of two components which define its physical location. Part one is the track address which defines the particular head under which the word will pass and the second part is the sector address which selects one of the six words which will pass under the selected head. Track refers to a group of six words along the length of the record card 2 and sector to a group of twenty-nine words across the width of the record card 2.

Both the track and sector address in which an operation is to take place must be established before a K44, read or write command signal is given. That is, the rules for addressing demand that neither component of the address may be altered once the forward motion of the record card 2 commences. This limitation is imposed by the method of locating the sector which will be described hereafter. It may be concluded that only one word may be written or read on each forward movement of the record card 2.

The track address selects which of the heads, 0 through 28, will be connected to the record and playback circuits. Both the record and playback circuits are connected across the selected head and the interior electronics of each assures it will not interfere with operation of the other. They are never in use at the same time. This connection is shown on the block diagram, FIGS. 3*a* and 3*b*.

The selection of a head is made via a direct coupled transistor pyramid which is used to convert a five bit binary code from the computer (not shown) into a one of thirty-two bit code. The pyramid provides an approximate DC ground potential to the center tap of the selected head winding. The center tap of all other heads are held at a positive potential. As a result, the two common lines connecting the record and playback circuits are also at approximately DC ground. A current source, located in the playback amplifier, provides sufficient current through the diodes, in series with the head, to bias them to a low impedance point on their forward characteristics. The positive potential at the center tap of all other heads keeps the associated series diodes biased off. The diode biasing current through the selected head is near enough equal in the two head windings to provide canceling of the flux generated at the head gap.

The playback amplifier is always in operation. That is, the playback amplifier is not deliberately switched off when recording or changing tracks. The output of the playback amplifier is merely ignored except at time of interest and recovery to proper operation following record or selection transients is made rapidly. The design of the playback amplifier provides protection against permanent destruction by transients.

Figures 8, 9:
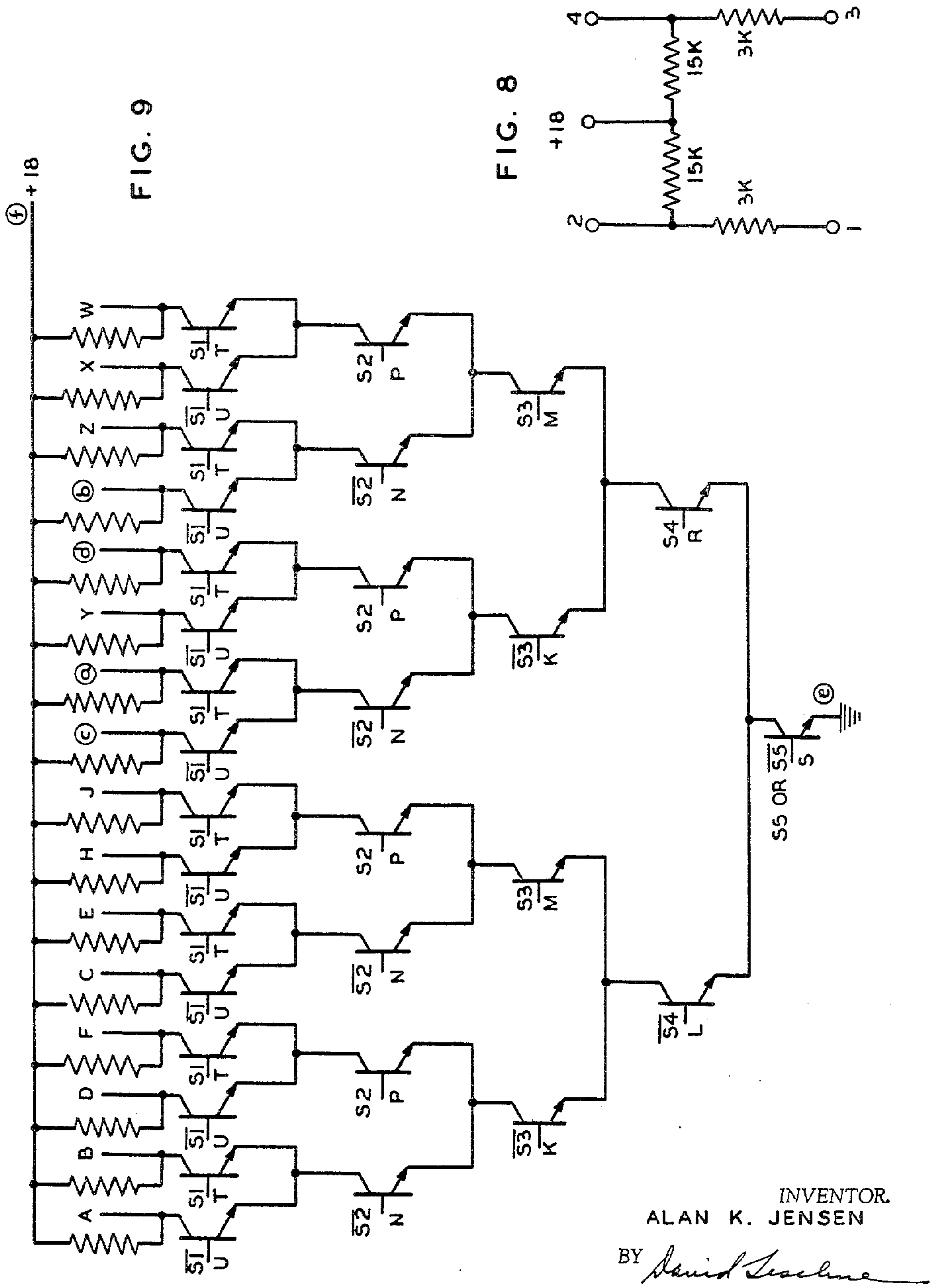
FIG. 8 is a schematic diagram of a selection voltage divider.
FIG. 9 is a schematic diagram of a portion of the head selection circuits of FIGS. 3*a* and 3*b*.

The binary coded address is supplied by five flip-flops in the computer (not shown). The ten signals, complements included, are fed into voltage dividers, providing a DC level shift and current limiting for driving the pyramid. A schematic of one divider is shown in FIG. 8. A schematic of one half the pyramid is provided in FIG. 9. The complete pyramid consists of two identical pyramids differing only in that signal S5 is sent to one half pyramid and $\overline{S5}$ to the other. On the block diagram of FIG. 3*a*, it can be seen the $\overline{S5}$ signal is applied to selection pyramid O to X and is used to select heads 0 through 15. The signal S5 is applied to the one half pyramid of FIG. 3*b* marked selection pyramid 10 to 1U and selects heads 16 through 28 of head bank 4. Referring to the pyramid schematic, FIG. 9, if head seven coupled to the pyramid output line J were to be selected, the computer code would be F1, F2, F3, $\overline{F4}$ and $\overline{S5}$. The five flip-flop outputs would be applied to voltage dividers, as shown in FIG. 8 and, the outputs of these dividers, would be applied to the selection pyramid O to X as the signals S1, S2, S3, $\overline{S4}$ and $\overline{S5}$. As may be seen in FIG. 9, these signals operate the five transistors to output line J. In all other paths, at least one transistor is off and an open circuit exists between the center taps and ground. These center taps will be pulled to +18 volts by the resistors shown. Note that only one divider may be connected to as many as 14 transistor bases. This is true because only one transistor being driven by each signal has a complete path to ground and can draw current from the divider. This simple analysis, of course, ignores the effect of leakage currents which forces the divider impedance to be relatively low.

A total of 32 addresses are available through selection but a smaller number of heads actually exist. If the number of required heads is 16 or less one selection pyramid may be removed without making any other changes.

SECTOR ADDRESS

One track on the record card 2 is reserved for placement of markers which signify the start of each word on the information track. These markers, as described above, consist of six holes which are punched by a standard record card punch. The exact location of the holes can be seen on the record card layout diagram FIG. 2. The entire track on which the holes lie is magnetically biased in the same direction. A head in the bank, reserved for the purpose, detects the change in the flux created as a hole crosses the head gap. The resultant head output is amplified and shaped into a consistent pulse amplitude and width. This pulse, termed the sector pulse, is fed to the computer and signifies the start of each of the six word locations. The computer (not shown) locates the sector of interest by counting these pulses as they appear.

Since the sector head is in close proximity to information heads in the head bank 4, noises created by recording and switching selection in these nearby heads will be picked up by the sector head. As a result the aforementioned rule is enforced which provides that the selection of the desired track must be established before forward motion of the record card 2 begins. Record noises entering the sector playback system are of no consequence since the sector must already be located if recording has begun and the sector information is of no further interest.

Figures 10A, 10B:
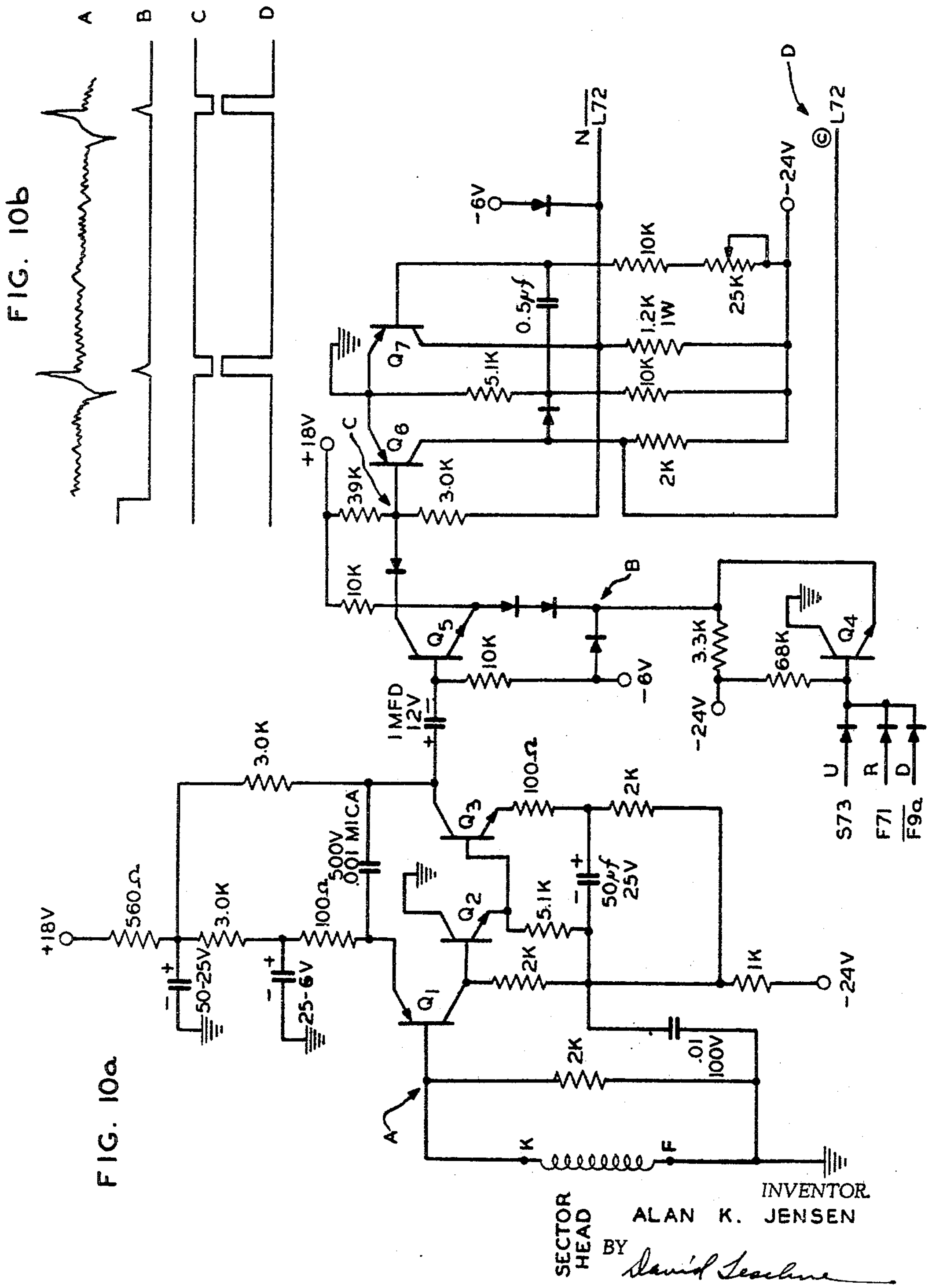
FIG. 10*a* is a schematic diagram of the Sector Playback System of FIG. 3*f*.
FIG. 10*b* illustrates the waveforms which may be detected at the indicated test points of FIG. 10*a*.

The sector pulse generating system is shown in the block diagram of FIG. 3*f* and the schematic diagram of FIG. 10*a*. The output of the sector head is continuously amplified, even if the search is not on, and fed to the L72 trigger gate. When allowed through the gate, the amplified pulse triggers a one-shot multivibrator which sets the amplitude and time duration of the sector pulse L72 and its complement $\overline{L72}$. The L72 trigger gate is open when the output of the three terminal, negative AND gate L, is low. Output line F71 will be low when the record card 2 is not traveling in the reverse direction. Signal S73 will be low when the record card 2 is not at the home position. $\overline{F9a}$ is a computer signal which is low when the computer is searching for the proper sector, by counting, and goes high as soon as the desired sector pulse appears. The L72 trigger gate therefore is open only when the record card 2 is traveling in the forward direction and the computer is searching for the sector. When the information playback system is described below, the need for a precisely timed and consistent length sector pulse will become apparent. The start of sector pulse is determined at the edge of a hole which produces a sharp, well-defined pulse at the output of the playback amplifier. The computer, however, if this is to be a recording, will begin the recording sometime during the sector pulse. Noise therefore may begin to enter the playback amplifier before the sector pulse is terminated. The computer is also interested in the timing of the end of the sector pulse. It is therefore necessary that the pulse width be independent of this noise. This is accomplished by triggering the one-shot when the playback pulse first appears, closing the gate at the appearance of the $\overline{F9a}$ signal, and allowing the one-shot to set the pulse length independent of any noise now appearing in the playback amplifier. The length of the L72 signal is set at 3 milliseconds and the one-shot is designed to provide this pulse width independent of DC power supplies.

Some typical waveforms at various noted points of the schematic diagram of FIG. 10*a* are shown in FIG. 10*b*.

The input, at point A, is the differential of the flux at the sector head. A negative pulse is produced as the leading edge of the hole appears and a positive pulse as the leading edge of the magnetized oxide appears. The polarization is dependent on the biasing flux and should always be in this direction. The proper waveshape is shown as A at FIG. 10*b*. Time from the leading to the trailing edge of the holes is approximately 4.0 milliseconds. Time between holes is approximately 57.0 milliseconds. Transistors $Q_1$, $Q_2$, and $Q_3$ of FIG. 10*a* form a class A, DC coupled amplifier. Transistor $Q_1$ is in a familiar common emitter connection. Transistor $Q_2$ of FIG. 10*a* is an emitter follower used to increase the input impedance of transistor $Q_3$. This is required since it is essential that the gain of the amplifier be insensitive to transistor parameters. Transistor $Q_3$ is a common emitter connection in which the AC reference (bypass) condenser is returned to a point other than AC ground. The collector resistor of transistor $Q_1$ and the emitter resistors of transistors $Q_2$ and $Q_3$ of FIG. 10*a*. are joined and returned to the —24 volt supply through a 1.0K ohm resistor. This junction is used as the AC reference for the emitter of transistor $Q_3$. The capacitor from this junction to ground, .01 microfarad, presents a high impedance to the signal frequency and is used only to bypass high frequency noises appearing on the —24 volt supply. An amplified signal, therefore, appears at this reference point due to collector current in transistor $Q_1$ and emitter current in transistor $Q_2$. The signal voltage across the transistor $Q_1$ collector load resistor 2K ohms is boot-strapped as is the emitter of transistor $Q_3$ and transistor $Q_2$. The purpose of this method of reference is to provide complete cancellation of large, low frequency, disturbances which are common on the —24 volt supply. Any noise appearing at the reference point, appears also at the transistor $Q_1$ collector and transistor $Q_3$ emitter and, thereby, is canceled. The boot-strapping action provides a large signal at the collector of transistor $Q_1$ when measured with reference to ground. The voltage measured differentially from the transistor $Q_1$ collector to the reference point is a true reflection of the gain of transistor $Q_1$. The waveform will be 180° phase shifted wtih respect to the input as seen at waveform A of FIG. 10*b*. The .001 mf. capacitor from the collector of transistor $Q_3$ to the emitter of transistor $Q_1$ of FIG. 10*a* is used to provide rejection through negative feedback of high frequency noise appearing at the input. The output of the class A section is taken from the collector of transistor of $Q_3$ and AC coupled to the base of transistor $Q_5$ where it referenced to the —6 volt supply. The waveform at this point will be essentially that of waveform A of FIG. 10*b*.

Transistor $Q_5$ of FIG. 10*a* and the three diode network on the base of transistor $Q_4$ form the L72 sector pulse trigger gate. Transistor $Q_4$ of FIG. 10*a* is merely a follower matching the high impedance diode net to the low impedance point B. When the logic conditions are such that the computer is searching for a sector pulse, all three diode inputs are low and point B drops to the lower clamp level of —6 volts. Current from the +18 volt source through the 10K ohm resistor provides a voltage drop through the two diodes, lifting the emitter of transistor $Q_5$ positive with respect to point B. Since both the base of transistor $Q_5$ and point B are referenced at the lower clamp voltage, transistor $Q_5$ is biased off. The back bias on transistor $Q_5$ of FIG. 10*a* provides a threshold on the gate which the positive half of the class A waveform must exceed to trigger flip-flop L72. The threshold, is used to prevent triggering of flip-flop L72 due to background noise in the sector playback. Background noise is due primarily to imperfections in the record card 2 surface. It is seen from waveform A that no background noise exists when the head gap is over a hold. When the positive peak of the pulse appears, the threshold is exceeded and transistor $Q_5$ turns on. This effectively couples thet transistor $Q_5$ emitter current supply, 3.3K ohms to the —24 volt supply line to the base of transistor $Q_6$. The portion of the positive peak which extends above the threshold can be seen at point B as shown by the waveform B of FIG. 10*b*. The appearance of the positive signal here indicates the clamp diode is turned off and all current is switched through transistor $Q_5$. The current arriving at the transistor $Q_6$ base succeeds in triggering the one-shot multivibrator, made up of transistors $Q_6$ and $Q_7$. When any one of the inputs to the diode gate moves positive with respect to ground, indicating the sector is found or is not sought, point B and the emitter of transistor $Q_5$ moves more positive to increase the threshold on transistor $Q_5$. This increased threshold cannot block the large noise pulses due to recordings but, the function is to prevent the collector of transistor $Q_5$ from moving negative, with respect to ground, even if noise pulses do exceed the threshold. Large positive noise pulses appearing at the base of transistor $Q_5$ can forward bias the collector junction and appear at the collector terminal. The series diode prevents these pulses from reaching the base of transistor $Q_6$.

Transistors $Q_6$ and $Q_7$ of FIG. 10*a* form a familiar one-shot multivibrator in which transistor $Q_7$ is biased normally on and transistor $Q_6$ off while a charge is stored on the .5 microfarad capacitor. When transistor $Q_6$ of FIG. 10*a* is triggered ON, the charge forces the base of transistor $Q_7$ positive and off until the capacitor can be discharged through the 10K ohm resistor and potentiometer. The 25K ohm potentiometer provides adjustment to compensate for initial component tolerance. The pulse width is set for a nominal 3.0 milliseconds. The 5.1K and 10K ohm divider restores the charge when the one-shot returns to the stable state. This divider is isolated from the load L72 by a diode to insure the charge against load changes. Since both the charging divider and the discharging current are referenced only to the —24 volt supply, the pulse width is independent of supply voltage within the ±25% limits. Note that the L72 signal is unclamped, to provide isolation of the charging divider, and therefore the pulse amplitude at point D is approximately equal to the supply voltage.

RECORD SYSTEM

Inasmuch as the speed of the record card 2 under the head band 4 is not constant nor synchronized to a computer clock rate the preferred embodiment of the invention is designed so that the information is self-clocking on playback, complete erasure of old information occurs as part of the write process and time is made available to synchronize the computer with the start of the word to be written or read. The method of recording commonly referred to as phase shift or Ferranti provides the self-clocking and complete write-over characteristics. The writing is done in synchronism with a computer clock pulse. A period of time referred to as the sector pulse time is provided during which the computer clock is located and the actual start of a writing occurs. Unused space on the record card 2, corresponding to the synchronization time, is made available between word sectors on a track. Some time during the sector pulse, when the computer determines that this is the sector of interest and the proper clock pulse is located, the recording begins with the writing of a preamble to the information word. The preamble is a DC current through the selected head which serves to erase or DC bias the area of the record card 2 leading up to the new word. This erasure is necessary to eliminate any part of an old word which may have existed and started earlier on the record card 2 due to differences in synchronization time (time to find the computer clock). The polarity of the DC current is made to be the same as the polarity of the first half of the first pulse to be recorded in the word.

Figure 11:
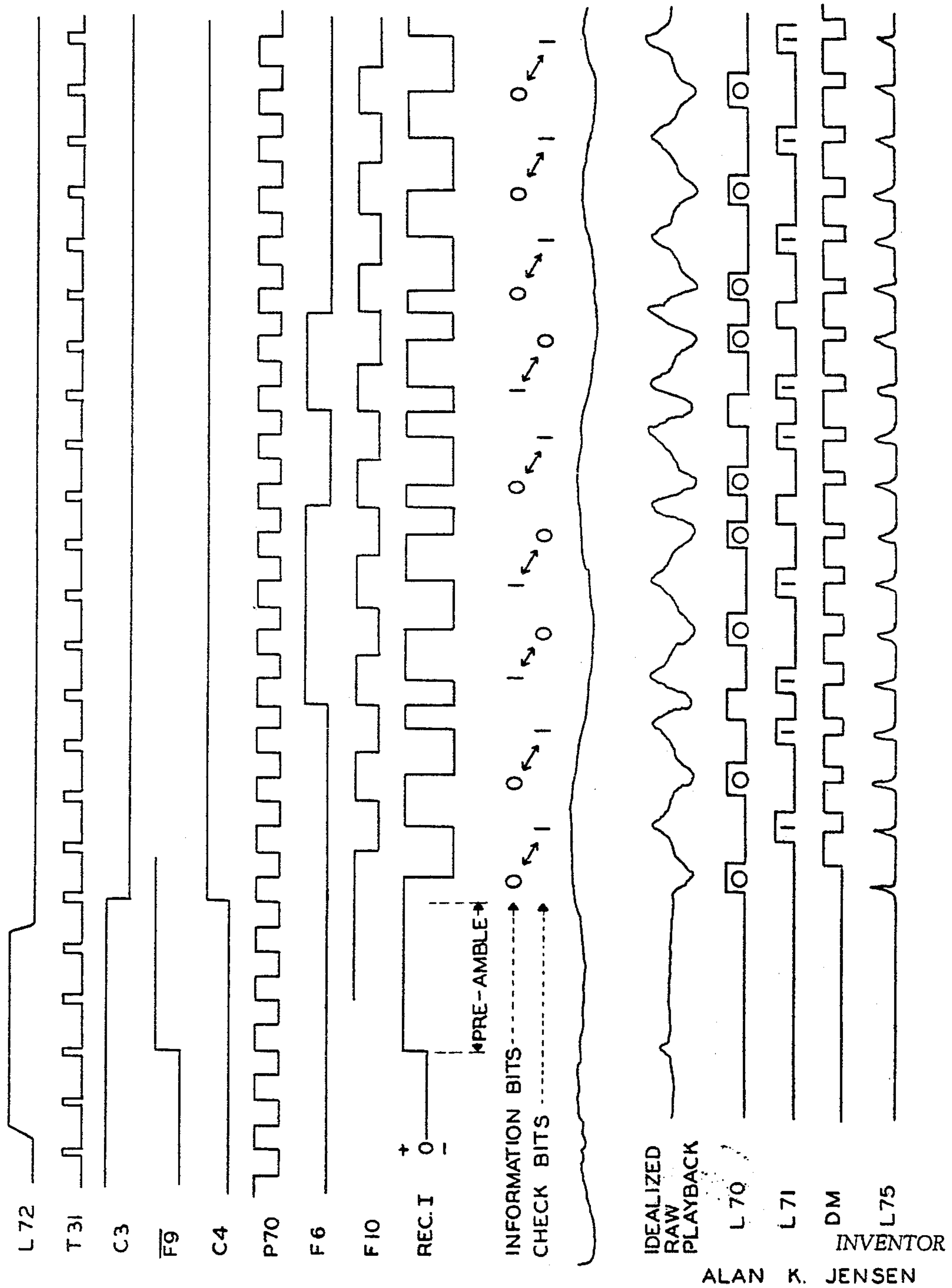
FIG. 11 illustrates typical record playback voltage waveforms.

Sample waveforms, pertinent to the record process, are shown in FIG. 11. The horizontal scale is one computer clock time division. Actually this clock is a word time pulse from the computer because the record card system bit time is equal to a computer word time. There is no vertical scale. Some signals such as $\overline{\text{F9}}$ and F10 are derived from computer flip-flops which serve other roles when not used for actual record circuit control. The waveforms for these signals are shown only during the times they are of interest in the explanation.

The signal L72 is the sector pulse or card word time pulse and as shown, arrives asynchronous to the computer pulse T31.

Signal C3 is a computer signal which denotes the time that the sector search is on. When the proper sector pulse is located, $\overline{\text{F9}}$, a second computer signal, is set up and the combination of signals F9 and C3 sets the period for writing the preamble.

Signal C4 is also a computer signal, and denotes the time of recording the actual number. The computer moves from C–3 to C–4 at a T31 pulse after L72 disappears. At this point $\overline{\text{F9}}$ is of no further interest in this discussion.

Signal P70 is a signal derived from a monostable multivibrator which is triggered by T31. It provides a symmetrical square wave which is used to divide each record card bit time into two equal parts. This signal is used to reverse the head current during each recorded bit. The current reversal supplies the required change in flux in every bit for self-clocking on playback.

F6 is a computer flip-flop which supplies the information to be recorded. A sample word is illustrated. Each bit of information to be recorded is held in F6 for two bit times and is recorded twice on the card. The second bit is used for error detection and is referred to as the check bit.

F10 is a computer flip-flop which is made to alternate on every T31 pulse and provide two conditions during the time of each bit in F6. The signal is used to complement the information presented by F6. A one therefore in F6 is recorded during the first bit time as a one and during the check bit time as a zero. The check bit for a zero in F6 is recorded as a one. It can be shown that this is an aid in error detection during playback.

Rec. I illustrates the effective direction of current in the record head for the example shown. Actually, the head is operated center tapped and the positive portion of the waveform represents current in one-half the head and the negative portion is current in the other half. The windings are wound to provide opposite flux patterns at the gap.

When $\overline{\text{F9}}$ appears, the first bit of information is waiting in F6 and the direction of the preamble current is determined by this bit. Signal P70 and flip-flop F10 have no effect on the preamble current. When the computer moves to C4 the preamble is stopped and the record current is now influenced by signal P70 and flip-flop F10. Note, however, that the first current to be recorded under the new control will be the same as the preamble. Half way down the first bit time, signal P70 changes state and provides the first current of flux reversal. At the end of the first bit, both flip-flop F10 and signal P70 change state resulting in no change of current until half way down the check bit when signal P70 again reverses. The direction of current or flux change is opposite of that of the first bit providing opposite polarity of check bit. The effects of the three signals P70, F6, F10 are added so that, whenever one or all of the three change state, the head current is reversed. When two change the head current remains unchanged. There is always current change in the middle of each bit due to signal P70. The direction of this change determines what the bit will be on playback. The direction of current change due to signal P70 in the check bits 2, 4, 6, 8, etc., is always opposite of the change in the middle of the preceding bit. It should be remembered that the first bit of information to be recorded must exist in F6 throughout the preamble time as well as during the first two bit times.

RECORD CIRCUITS

Figure 14:
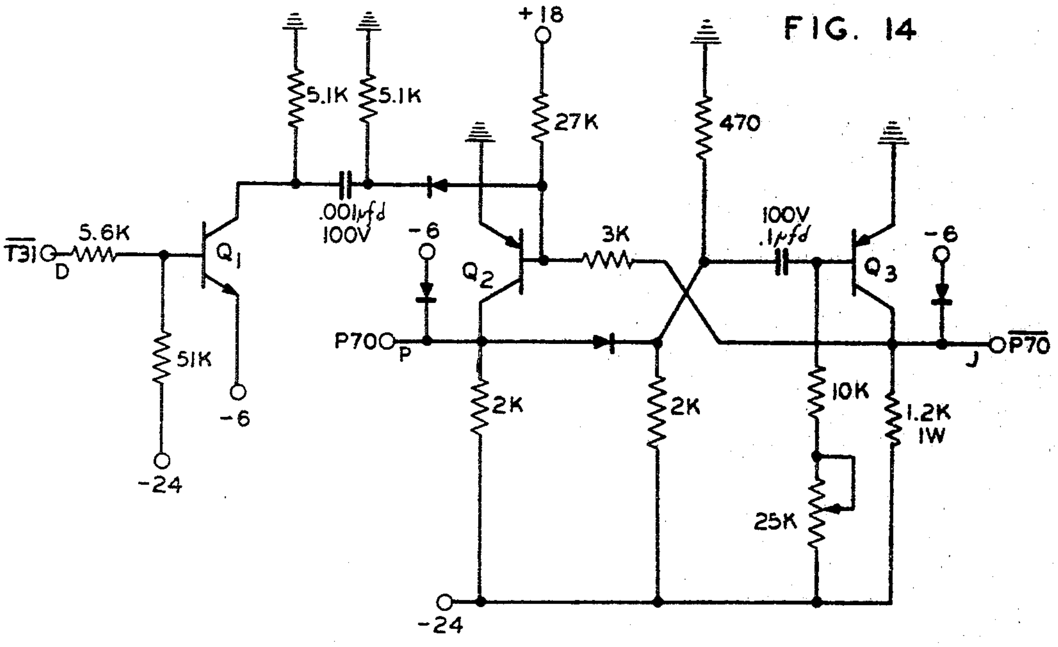
FIG. 14 is a schematic diagram of the Record Clock or P70 Pulse Generator of FIG. 3*a*.
Figure 12:
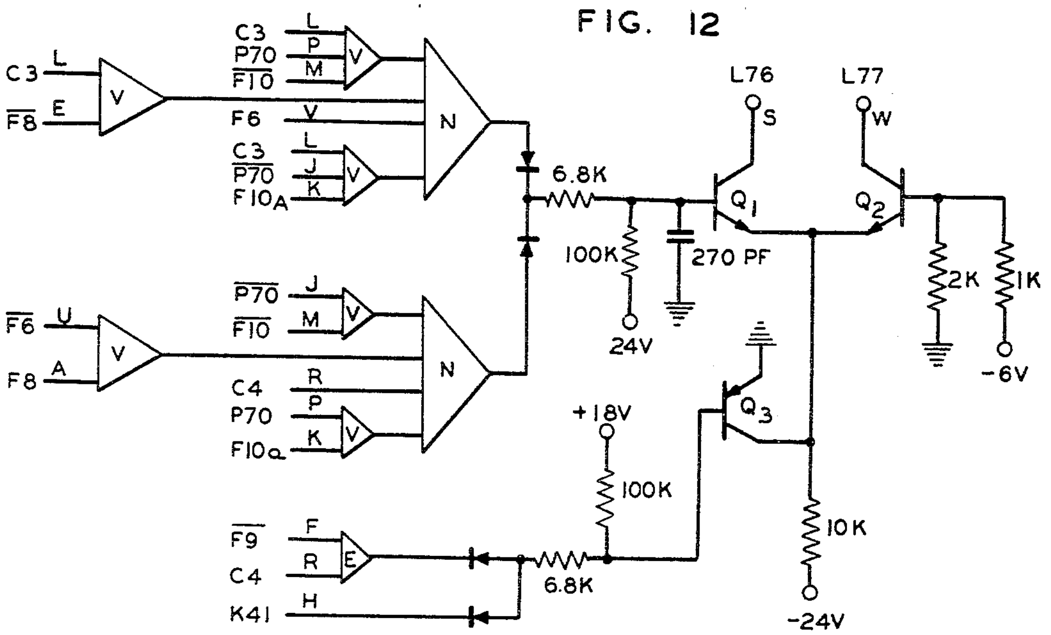
FIG. 12 is a schematic diagram of the Record Logic and Record Switch circuitry of FIG. 3*a*.
Figure 13:
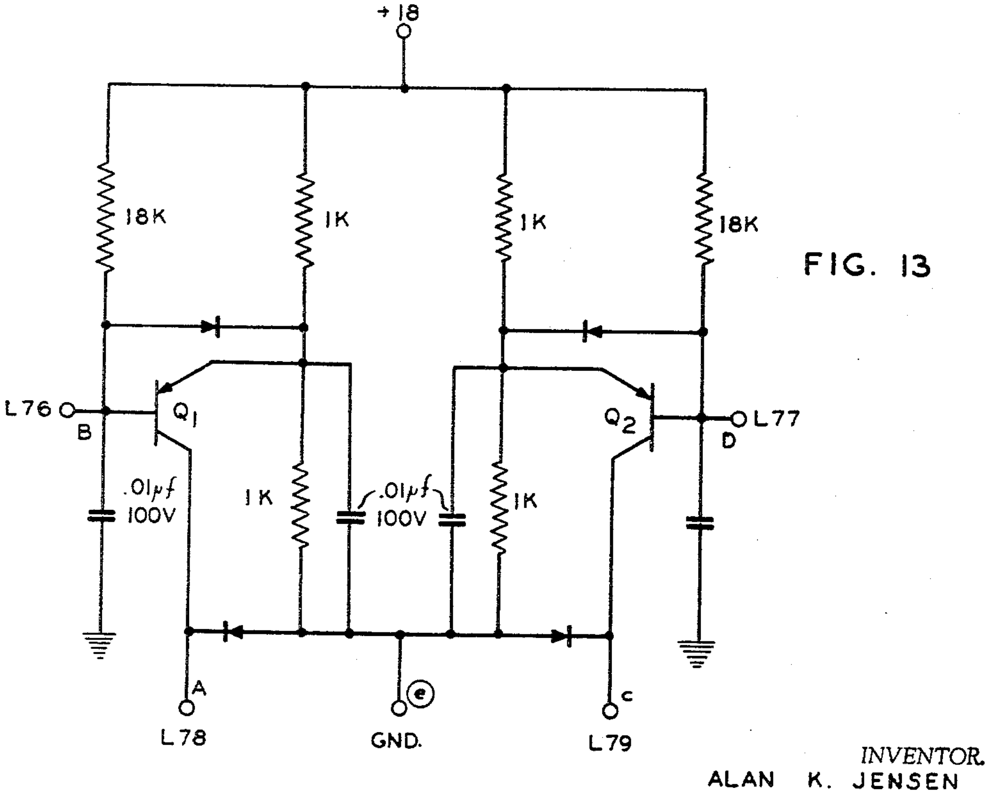
FIG. 13 is a schematic diagram of the Record Amplifier of FIG. 3*a*.

The record electronics is shown in block form at FIG. 3*a*. The record electronics are shown in schematic form in FIGS. 12, 13 and 14 and described in detail in copending application Serial No. 223,361. FIG. 12 illustrates the record logic and switch, FIG. 13 illustrates the record amplifier and FIG. 14 illustrates the record clock generator.

PLAYBACK SYSTEM

The playback circuits operate continuously. The playback electronics are shown in block form in FIG. 3*b* and in schematic form in FIG. 15. That is, there is no switching on and off of the playback circuits. Therefore, meaningless noise, such as occurs during record operations, is merely amplified and passed on through to the output lines. The computer ignores these meaningless outputs by selecting only the proper time during a read operation in which to view the playback output. The time selection is made by straightforward logic means in the computer and the electronic details will not be covered herein.

The basic playback amplifier input is, of course, the two common head leads on which appears the playback signals from the selected track. Each sector on the track appears in sequence as they pass under the head. They are all played back and the information extracted and sent to the computer with appropriate sense pulses.

Although the playback is self-clocking the actual sensing is done within the computer. The record card system, however, provides the three necessary information lines with which this can be accomplished. One value bits appear as positive pulses on a first wire, zero value bits as positive pulses on a second wire, and strobe pulses appear on a third line which indicate the time to sample or sense the former two. The sense or strobe pulse is sent in synchronism with computer time.

In FIG. 11 a playback waveform containing the information recorded in the sample word F6 is illustrated. This playback waveform is not synchronous to any of the record pulses because the speed of the record card 2 may have been different between the writing and reading of any given information. It is possible that this information may have even been recorded in a different transport and/or with a different computer. The playback waveform is the derivative of the flux recorded on the track. The smaller positive pulse is a result of the beginning of the preamble and would be under ideal conditions half the normal pulse amplitude. The pulse may not exist at all under many conditions, however, due to unknown time relation with former preamble pulses of the opposite polarity. In any case, this pulse is only of academic interest since it is not used for information recovery.

This waveform is fed to the balanced input of a differential coupled amplifier which may be seen connected to the common head leads in the block diagram of FIG. 3*b*. The waveform shown in FIG. 11 is impressed across the input terminals A and B. With reference to ground the wave forms on terminals A and B are of half the input amplitude and 180° phase shifted with respect to one another. After sufficient class A amplification in which both phases of the signal are preserved, the two signals are sent to separate nonlinear switching stages. These final stages are provided with a threshold which the signal must exceed in order to proceed further. The thresholds serve to remove effectively a slice from the center of the playback waveform in FIG. 11 and provide the output pulses termed L70 and L71 as shown in FIG. 3*b*. Whenever the linear output exceeds the threshold in a negative direction, a pulse is produced on line L70. Exceeding the threshold in a positive direction produces an output pulse on line L71. Pulses on line L70 indicate possible zeros and line L71 possible ones. As indicated above, not all the pulses on lines L70 and L71 are useful. Only those which correspond to a flux reversal in the middle of a recorded bit are meaningful. Or, only pulses as a result of flux reversals due to a record current change caused by signal P70 are of interest. Referring back to the record waveforms, the first change in waveform Rec. I after the preamble is caused by signal P70 alone (negative going). The second change, which is positive, is also due to signal P70 only and both of the foregoing will provide meaningful output pulses on lines L70 and L71 due to the corresponding flux change. The fifth reversal (negative) is not at the half bit time and is caused by the combination of changes in flip-flop F6, F10, and signal P70. The pulse due to this flux reversal on playback will have to be ignored.

In noting how the above is accomplished it should be understood that each word on the playback is preceded by a sector pulse L72 from the sector playback system. The computer determines that this is the sector of interest sometime during an L72 pulse. It has been described above how the first flux reversal following a sector pulse is always a meaningful one and is caused by signal P70 only. Therefore, the first pulse to appear on lines L70 and L71 is an information pulse—its value (one or zero) determined by its appearance on lines L70 or L71. Working from this first pulse, the others are determined as follows. The record waveforms, reveal that the time interval between useful flux reversals is equal to twice the time interval between a useful and a meaningless one. Given the first useful pulse, a time delay circuit can be set such that it will be long enough to extend beyond the next meaningless pulse, if one exists, but not long enough to extend beyond the next useful pulse. The half bit rate of signal P70 guarantees that there will be one useful pulse in each bit period. It can be shown that if the delay circuit described is triggered by each useful pulse, at the end of the delay, another useful pulse will exist on one of the two leads L70 or L71. The delay circuit used for this purpose is a monostable multivibrator which may be seen at FIG. 3*a*. One output of the delay circuit is labeled DM and the waveform is shown on FIG. 11. The DM is actually triggered by the trailing edge of each useful pulse. As can be seen on the block diagram of FIG. 3*b* lines L70 and L71 are fed to the DM trigger network. Also, an output from the DM is fed back to itself to prevent retriggering by a meaningless pulse which occurs during the delay period.

It becomes obvious now that given an output from the DM and the two pulse trains on lines L70 and L71, it is possible to separate out the useful pulses and determine the information.

All pulses occurring on lines L70 and L71 are sent to the computer. An accompanying strobe signal must be manufactured to indicate which of the pulses are useful or meaningless. This strobe signal could be obtained from the DM except that it must be synchronized with a high speed computer clock, i.e., high speed as compared to T31. The strobe pulse L75 is manufactured from a flip-flop circuit. This network including the flip-flop L75 can be seen in FIG. 3*b*. As a general rule, L75 will be set, and a strobe pulse generated at the end of every DM delay period, if a pulse exists on lines L70 or L71. The setting of flip-flop F75 will occur on a computer clock pulse Z3. Flip-flop L75 will reset itself on the following computer clock pulse Z3. A trigger gate with temporary memory is provided to avoid the setting of flip-flop L75 more than once for each cycle of the DM. The L75 trigger gate is closed by strobe pulse L75 when a pulse is accepted. The gate is normally reopened again after the DM completes its next blanking period.

Another input to the L75 trigger gate is the complement of the sector pulse $\overline{\mathbf{L72}}$. This pulse is used to prevent noise from triggering flip-flop L75 during the period of the sector pulse when it is known that no useful information exists. The source and evaluation of this noise will be discussed later in this section.

Logical operation of the L75 trigger gate may be summarized as follows. An L75 set pulse will be generated whenever a pulse exists on lines L70 or L71, and it is neither sector period nor the blanking period due to DM, and the DM has cycled through the blanking period since the last stroke pulse L75 was generated. The L75 strobe pulse will always be one computer bit time long and will be approximately 24 microseconds. Included in the L75 trigger gate is an inversion since flip-flop L75 is a negative trigger flip-flop.

The output from flip-flop L75 as a result of the above logic is shown in FIG. 11. Whenever an L75 strobe pulse is generated a useful pulse exists on either the L70 or L71 lines.

An output from the L75 flip-flop is sent back to the playback amplifier. The purpose of this connection is to remove effectively the threshold from the switching stage and thereby increase the gain of the playback amplifier. The threshold is used to prevent further amplification of low level signals which are presumed to be background noises. Once an L75 strobe pulse is generated, it is assumed that the signal is a valid one, and the threshold is removed to assure that the signal will be strong enough to persist on the output wires and be sensed. This is especially necessary on the first bit, because the DM is not yet operating and therefore an L75 strobe pulse will be generated as soon as the playback exceeds the initial threshold. Since the rate of change of the signal is slow at this point, a small imperfection in the record card 2 surface could temporarily reduce the playback so as to remove the output pulse at the same time an L75 strobe pulse appeared. This would provide the computer with a clock and no accompanying bit to sense. Removing the threshold forces this bit to last throughout the clock.

In reconstructing the information, it should be remembered that two bits are recorded for every information bit of the original flip-flop F6. The second bit of each pair is the redundant or check bit and is of the opposite polarity of the original F6 signal. By extracting the first, third, fifth, etc., bits, one can see that the binary value of these bits on lines L70 and L71 corresponds to the setting of flip-flop F6.

Even though the system is self-clocking and intended for asynchronous operation, there are limitations on variations in record card 2 speed which can be accommodated. This limit is due primarily to the use of a real time base for the selection of output pulses. The DM circuit provides a fixed delay and as previously stated, must completely blank a meaningless pulse yet stop blanking before the end of the next useful pulse. Assuming all other conditions ideal, the maximum record card speed change that can be tolerated is normally not more than ±25%. Actual record card speed variations generally experienced are less than ±10% and so this has become no great disadvantage. It is important to note that the DM is triggered by the trailing edge of an accepted pulse since it can be shown that some compensation for record card speed change is thus obtained as well as minimized effect of component drift in the DM.

The raw playback waveform shown in FIG. 11 is idealized to a great extent. The background noise due to imperfections in the record card surface exists here as described previously in the description of the sector playback.

This noise provides pulses at the input during periods when there are no information pulses. It also causes substantial amplitude variations in the information playback. In addition, variations in amplitude are caused by loss of intimate head to record card contact and speed changes. In view of the existence of these noise pulses, it is important to note that once the first bit appears and triggers the DM, the L75 trigger gate is blocked except when a useful information bit is anticipated. As a result, noises occurring when real information does not exist is ignored. Further, since the system is dependent on signal polarity and not amplitude (providing the threshold is exceeded), any noise occurring at useful bit times will do no damage unless it is capable of completely obliterating the playback signal. It will be shown below how even this can not cause a system error.

Another input to the L75 trigger gate is the signal $\overline{\mathrm{L72}}$. The first pulse on lines L70 or L71 is not due until shortly after the signal $\overline{\mathrm{L72}}$ goes high. In the record process, information is not recorded until after the end of the sector pulse. The $\overline{\mathrm{L72}}$ signal serves to prevent accepting any pulses during this time and thereby blocks background noise almost up to the time information begins. In normal operation then, the only time the playback is susceptible to pulses due to background noise is the short period of time between the end of the sector pulse and the appearance of the first bit. This period of time is a variable dependent on the time to synchronize with the computer when the recording was made.

It is improbable that a noise pulse of sufficient amplitude will appear at this precise time. In any case, if it should occur, there is time for a maximum of one noise pulse to be accepted into the sensing system before the real information appears. It is described hereafter how such an error will always be detected.

PLAYBACK CIRCUITS

Figure 15:
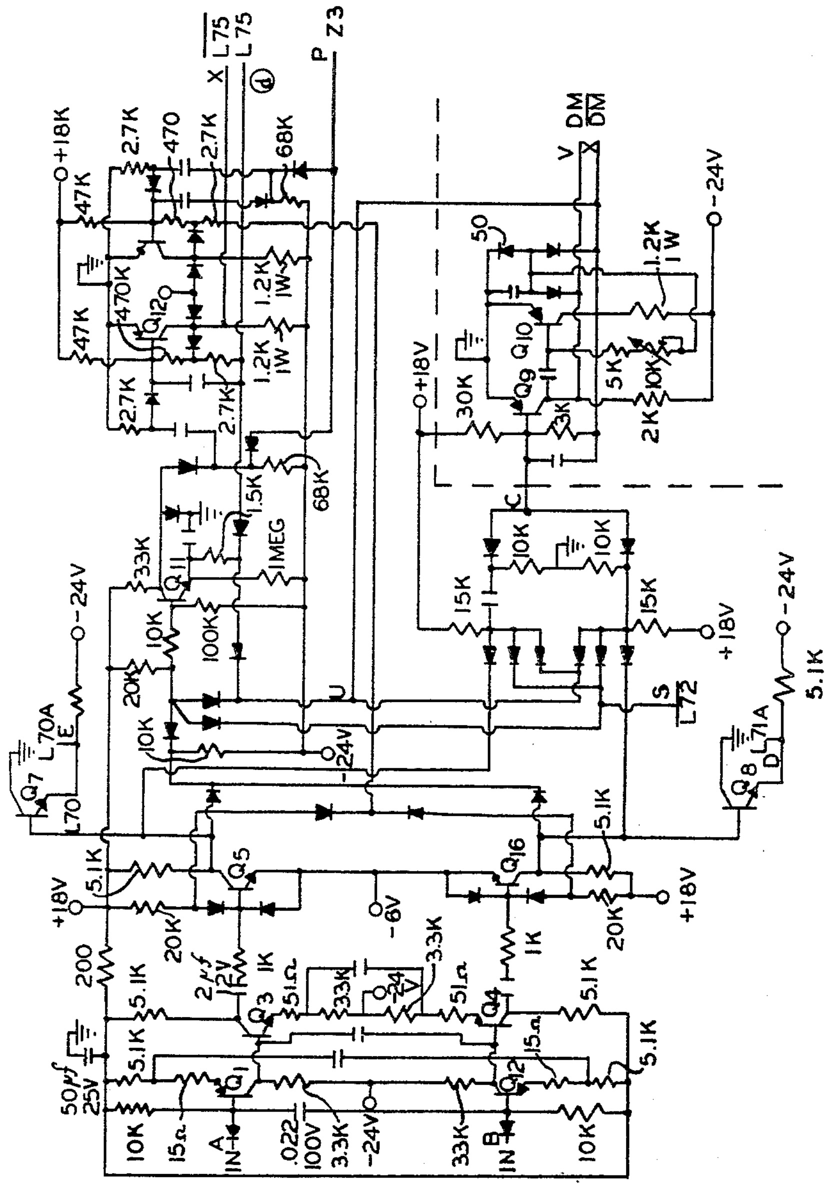
FIG. 15 is a schematic diagram of the Playback Amplifier and Sensing circuitry of FIG. 3*b*.

A schematic of the playback circuits including the sensing multivibrator (DM) and the clock flip-flop (L75) appears in FIG. 15.

The input terminals A and B are connected to the common head leads. Since the center tap of the selected head is essentially grounded (AC and DC) through the selection pyramid (see FIG. 9) the playback waveform appears differentially across A and B. The two input diodes prevent surge currents through the amplifier during a recording. The 10K ohm bias resistors supply current down through the selected head and pyramid path to ground. This current is needed to place the selection diodes as well as the input diodes in the forward low impedance region. The playback signal is small, approximately 20 millivolts, and so the diodes remain in the low impedance condition throughout the complete cycle of the input waveform.

Transistors $Q_1$ and $Q_2$ of FIG. 15 form the first stage and transistors $Q_3$ and $Q_4$ the second stage of a class A differential amplifier. This amplifier provides maximum common mode noise rejection and cancellation of low frequency power supply fluctuations. The capacitor across the input terminals provides cancellation of unbalanced high frequency noise. The playback waveform at the output of the first stage must be viewed with a differential connection from the collector of transistor $Q_1$ to the collector of transistor $Q_2$. This is necessary because at this point the ripple in the power supply exceeds the signal. The ripple is canceled in the second stage and the waveform at the collector of transistor $Q_3$ and transistor $Q_4$ may be viewed single ended and will be similar to the linear waveform shown in FIG. 11. The waveform at the two collectors are 180° phase shifted and are AC coupled to the threshold switches transistors $Q_5$ and $Q_6$. The switch transistors $Q_5$ and $Q_6$ are biased on to saturation with approximately 1 ma. of base drive via the 20K ohm resistors. This 1 ma. of drive sets the threshold at approximately 1 volt across the 1K ohm series input resistor. That is, in order to exceed the threshold and turn off the switch, the input end of the series resistor must be pulled to about 1 volt negative with respect to the base. When the threshold is exceeded, the transistor $Q_5$ or $Q_6$ will turn off and the output line L70 or L71 will rise to ground due to the 5.1K ohm collector resistor, clamped by transistors $Q_7$ or $Q_8$ of FIG. 15. The diode from emitter to base of transistors $Q_5$ and $Q_6$, tends to balance the load on the input signal and prevents asymmetrical charging of the coupling capacitor. The signal $\overline{\mathrm{L75}}$ from the L75 flip-flop serves to remove the threshold. When a sense pulse L75 is generated signal $\overline{\mathrm{L75}}$ goes low and shunts the bias current through the two high conductance diodes. The series diodes connected to the bases turn off to isolate the signal $\overline{\mathrm{L75}}$ from the base circuits. It should be pointed out that even though the quiescent ON bias current is removed on both transistors, only the one transistor where the threshold was exceeded will be off since the opposite input is 180° phase shifted and is now supplying ON drive.

Transistors $Q_7$ and $Q_8$ of FIG. 15 are simple emitter followers used to lower the output impedance to drive the cable and computer loads.

Transistors $Q_9$ and $Q_{10}$ of FIG. 15 form the delay multivibrator (DM). Both lines L70 and L71 are fed to an input of the DM. There are two input networks to the DM. One causes triggering of the DM due to an accepted output on line L70, the other on line L71. Both triggers are derived in three terminal AND circuits. The other inputs to the ANDs are signals $\overline{\mathrm{L72}}$, the complement of the sector pulse, and $\overline{\mathrm{DM}}$, high when the DM is not triggered. The result is that the DM will be triggered by a pulse on lines L70 or L71 if it is not already running and the sector period is over. It has been described that this causes the DM to be triggered each time a pulse is accepted as valid. Some time during the next valid pulse time, the delay will run out and $\overline{\mathrm{DM}}$ will go to ground. At this time either lines L70 or L71 should be high and one of the input capacitors will be discharged through the 15K and 10K ohm resistors. The actual triggering takes place at the end of the information pulse. When the lines L70 or L71 drop to −6 volts the formerly discharged input capacitor must gain a 6.0 volt charge which it does through the base of transistor $Q_9$. Transistor $Q_9$ of FIG. 15 turns ON at this point and the DM is triggered. $\overline{\mathrm{DM}}$ drops to −6 volts and blocks further triggering until the delay period is over. Transistors $Q_9$ and $Q_{10}$ of FIG. 15 operate as in any common monostable multivibrator and will not be discussed in detail here. It should be noted, however, that a Zener regulated supply 50 is used for both the clamping and the discharge current source. This assures the delay period independent of supply variations and at the same time rapid transistion between the two states.

The triggering conditions for the sense clock flip-flop are complex and bear repeating prior to circuit examination.

$$\text{Set L75} \equiv \text{generate a sense pulse}$$

$$\text{Set L75} \equiv (\text{L70} \vee \text{L71}) \cdot (\overline{\text{DM}}) \cdot (\overline{\text{L72}}) \cdot (\text{Z3}) \cdot (\text{X} \vee \text{Y})$$

Where:

$L70 \vee L71$ = a possible one or zero present $\overline{DM}$ = DM not running $\overline{L72}$ = not sector pulse time Z3 = computer logic clock X = DM has cycled since last L75 pulse Y = several bit times since last L75 pulse The signals X and Y are pseudo signals. That is, the signals, as such, do not really exist but the conditions described are defined by the state of the trigger network. The need for X and Y can be described as follows.

The computer clock signal Z3 will occur many times during each pulse on lines L70 and L71. Only one sense pulse must be generated for each accepted one or zero. Condition X provides that only one L75 pulse can be generated for each cycle of the DM. Since the DM is cycled at the end of an accepted one or zero, flip-flop L75 can be set only once for each valid signal on lines L70 or L71.

Condition Y is necessary to provide a clock for the first information bit. During the early portion of sector pulse time, the output of the amplifier is uncertain due to the partial cancellation of the pulses caused by the beginning of the preamble. As a result, the last sequence of flip-flop L75 and DM is unknown. Since a period of several bits will pass during the playback of the preamble in which no pulses are present, condition Y assures ability to set flip-flop L75 on the first bit.

Signal $\overline{L72}$ is used to reduce the time for accepting pulses due to background noise in the preamble and also allows time for establishing quiescent conditions on flip-flop L75 and the DM prior to arrival of the first pulse.

Mechanization of the above described logic can be illustrated as follows.

A standard logical OR circuit is formed with the two diodes connecting lines L70 and L71 to a 10K ohm resistor which provides ($L70 \vee L71$). This circuit serves as one input to a three terminal AND gate in which $\overline{L72}$ and $\overline{DM}$ are entered. The output of the AND gate drives the base of transistor $Q_{11}$ (see FIG. 15) through a resistive divider which merely provides appropriate level shifting. At the base of transistor $Q_{11}$ we have derived in positive form $(L70 \vee L71) \cdot (\overline{DM}) \cdot (\overline{72})$.

The term X or Y is derived in negative form on the emitter of transistor $Q_{11}$. When both the base and emitter terms are true, transistor $Q_{11}$ will turn on providing a negative output to the final diode gate which is a negative AND gate in which the computer clock signal Z3 is entered. Signal L75 will be set at the appearance of the first computer clock signal Z3 after the input provided by the collector of transistor $Q_{11}$ drops low.

The formation of the term X or Y on the emitter of transistor $Q_{11}$ of FIG. 15 is as follows:

The capacitor on the emitter of transistor $Q_{11}$ of FIG. 15 will be charged to approximately −6 volts in order to provide setting of flip-flop L75. When the base logic comes true the transistor $Q_{11}$ will turn on. The capacitor is large enough to maintain the −6.0 volt charge in the face of being discharged by the base and collector currents for a period equal to several computer clock signals Z3. The collector and input to the final diode net will therefore stay low long enough to guarantee the capture of a computer clock signal Z3 and set flip-flop L75. The L75 output of the flip-flop L75 is fed back through a diode and 1.5K ohm resistor to the emitter of transistor $Q_{11}$. As soon as flip-flop L75 is set this connection serves to rapidly discharge the capacitor, shutting off transistor $Q_{11}$ and halting further triggering of flip-flop L75. When flip-flop L75 is reset, the capacitor will begin to charge again through the 1 megohm resistor. This time constant, however, is very long and the charge is never re-established before the end of the input pulse on lines L70 or L71. Even if it were possible for the charge to move enough negative to turn transistor $Q_{11}$ back on, the 1 megohm resistor could not supply sufficient current to pull the collector negative. Instead when the pulse on lines L70 or L71 is terminated, i.e., moves negative it triggers the DM. $\overline{DM}$ as a result moves negative and restores the charge on the capacitor through the 1.5K ohm resistor and diode to $\overline{DM}$. At this point, $\overline{DM}$ blocks the positive base logic and although the charge is restored transistor $Q_{11}$ remains off. The next opportunity for transistor $Q_{11}$ to be turned on will occur when the delay period is over and $\overline{DM}$ returns to ground. At this point another "valid" pulse on lines L70 or L71 should be present and the cycle repeats. Condition X is thus provided for and it is guaranteed that only one L75 signal will be supplied with each "valid" information pulse.

Condition Y is supplied by the long time constant of the emitter capacitor and the 1 megohm resistor. During the playback of the preamble the complemented sector pulse ($\overline{L72}$) will be low holding transistor $Q_{11}$ off and preventing triggering of DM. Since neither flip-flop L75 nor DM will be triggered during this period the 1 megohm resistor will slowly charge the capacitor in preparation for the first pulse after the sector pulse period.

It should be noted that flip-flop L75 and $\overline{DM}$ could be shorted together through the diode network in the emitter of transistor $Q_{11}$ if signal L75 were high at the same time as $\overline{DM}$ were low. This situation will never occur under normal circumstances. If it does occur as a result of some circuit triggering mulfunction, a reading error has already occurred and since no permanent damage can be done this is of little consequence.

The reset condition for flip-flop L75 is merely $(L75 \cdot Z3)$ which provides a sense pulse one computer logical bit time long. The computer logic bit time is approximately 24 microseconds as compared to a 750 microseconds bit time in the card system. Signal L75 therefore appears as a very sharp pulse when viewed in comparison with the playback pulses and cannot be drawn to scale in FIG. 11.

Transistors $Q_{12}$ and $Q_{13}$ make up the flip-flop circuit.

ERROR DETECTION

The major source, by far, of possible errors in the magnetic record card system is the phenomena known as drop-out.

The term drop-out is used to indicate sufficient separation between the head and record medium to cause degradation of resolution and/or amplitude.

Some sources of drop-out may be foreign material on record card surface transported under the head, distortion of the record card due to bends or folds, or loss of magnetic coating on surface due to wear.

The special error detection techniques used in the system are directed primarily to detecting these drop-outs although many other errors may also be discovered in the same manner.

Figure 16:
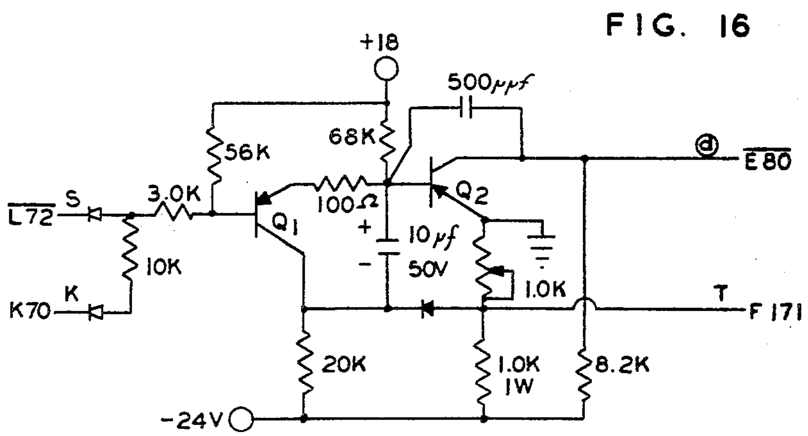
FIG. 16 is a schematic diagram of the Sector Drop-Out Detector of FIG. 3*d*.
Figure 17:
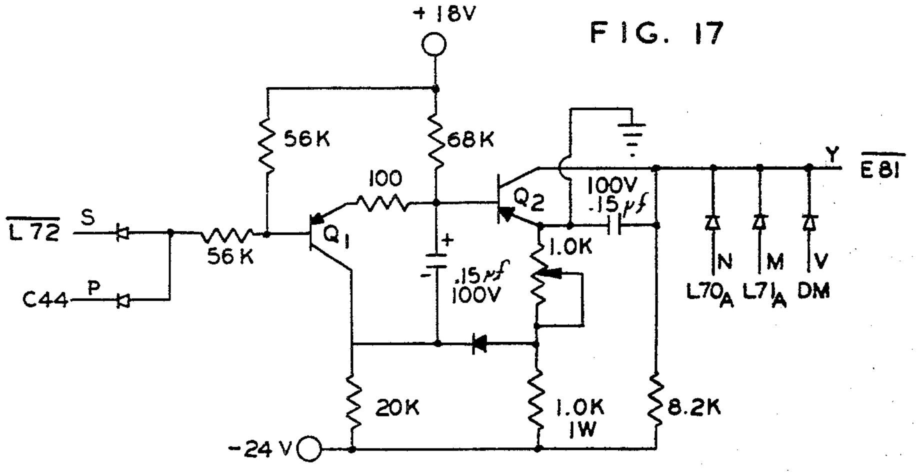
FIG. 17 is a schematic diagram of the Information Drop-Out Detector of FIG. 3*e*.

FIG. 16 illustrates the sector drop-out detector while FIG. 17 illustrates the information drop-out detector. This circuit is described in greater detail and claimed in U.S. Patent 3,233,118 issued Feb. 1, 1966 for a "Missing Pulse and Busy Signal Control Circuit" by A.K. Jensen and assigned to the assignee of the instant invention and in the cited application Ser. No. 223,361.

FIG. 18 is a plan view of the magnetic card device which illustrates the physical arrangement of the card transport, drive sources and computer electronics.

It is thus seen that the apparatus shown and described fully accomplishes the objects of the invention by utilization of the many novel features.

It should be understood that this invention is not limited to specific details of construction and arrangement thereof herein illustrated and that changes and modifications may occur to one skilled in the art without departing from the spirit of the invention; the scope of the invention being set forth in the following claims.

I claim:

1. In an information storage apparatus adapted to store information signals upon a record medium, a playback system for sensing information signals so stored and providing output signals indicative of stored and useful information comprising: transducing means for sensing signals stored upon said record medium; variable gain amplifier means coupled to said transducing means for receiving and amplifying signals sensed by said transducing means; said amplifier means having a first gain level for accepting signals over a predetermined amplitude and for rejecting unwanted signals from said record medium and a second gain level for accepting signals of below said predetermined amplitude but wanted; control means coupled to said amplifier means to control the gain level thereof; amplitude detection means coupled to amplifier means and said control means, to determine the amplitude of the amplified signals; said amplitude detecting means providing a first control signal to said control means when the amplitude of said amplified signals exceeds said predetermined amplitude; said control means providing a second control signal to said amplifier means for changing said amplifier means from said first gain level to said second gain level to receive the remainder of the amplified signal regardless of whether or not it exceeds said predetermined amplitude; reset means coupled to said control means to cause said control means to provide said amplifier means a third control signal after a predetermined time to return said amplifier means to said first gain level prior to the receipt of the next amplified signals and output means coupled to said amplifier means for receiving said useful signals.

2. In an information storage apparatus adapted to store information signals upon a record medium, a playback system capable of producing output signals in response to the sensing of valid information signals stored on said record medium by a transducing means comprising: variable gain amplifier means for receiving and amplifying sensed signals from said transducing means; said amplifier means having a first gain level for accepting signals exceeding a first predetermined amplitude indicative of valid information signals and a second gain level for accepting signals having an amplitude below said first predetermined amplitude but exceeding a second predetermined amplitude; and control means coupled to said amplifier means to control the gain level thereof in response to the amplified signals from said amplifier means; said control means providing a first control signal to hold said amplifier means in said first gain level and providing a second control signal to switch said amplifier means to said second gain level upon the receipt of an amplified signal exceeding said first predetermined amplitude whereby the remaining portion of a signal received by said amplifier means is accepted as valid once a portion of said signal has exceeded said first predetermined amplitude.

3. In an information storage apparatus adapted to store information signals upon a record medium, a playback system capable of producing output signals in response to the sensing of valid information signals stored on said record medium by a transducing means comprising: variable gain amplifier means for receiving and amplifying sensed signals from said transducing means; said amplifier means having a first gain level for accepting signals exceeding a first predetermined amplitude indicative of valid information signals and a second gain level for accepting signals having an amplitude below said first predetermined amplitude but exceeding a second predetermined amplitude; timing means for providing operating signals; and control means coupled to said amplifier means and said timing means to control the gain level of said amplifier means in response to the amplified signals from said amplifier in the presence of said operating signals; said control means providing a second control signal to switch said amplifier means to said second gain level upon the receipt of an amplified signal exceeding said first predetermined amplitude whereby the remaining portion of a signal received by said amplifier means is accepted as valid once a portion of said signal has exceeded said first predetermined amplitude.

References Cited

UNITED STATES PATENTS

| | | | |
|---|---|---|---|
| 2,239,042 | 4/1941 | Kleber et al. | 179—100.1 |
| 2,597,238 | 5/1952 | Gerber et al. | 179—100.4 |
| 2,807,797 | 9/1957 | Shoemaker | 340—174.1 |
| 2,901,737 | 8/1959 | Stovall | 340—174.1 |
| 3,041,415 | 6/1962 | Gratian | 179—100.2 |
| 3,182,135 | 5/1965 | Siezen | 179—100.2 |

BERNARD KONICK, Primary Examiner

V. P. CANNEY, Assistant Examiner

U.S. Cl. X.R.

179—100.2